United States Patent
Wheeler et al.

(10) Patent No.: US 10,794,711 B2
(45) Date of Patent: Oct. 6, 2020

(54) HIGH DEFINITION MAP UPDATES BASED ON SENSOR DATA COLLECTED BY AUTONOMOUS VEHICLES

(71) Applicant: DeepMap Inc., Palo Alto, CA (US)

(72) Inventors: Mark Damon Wheeler, Saratoga, CA (US); Xiaqing James Wu, Foster City, CA (US); Wei Luo, Saratoga, CA (US)

(73) Assignee: DEEPMAP INC., Palo Alto, CA (US)

( * ) Notice: Subject to any disclaimer, the term of this patent is extended or adjusted under 35 U.S.C. 154(b) by 349 days.

(21) Appl. No.: 15/859,011

(22) Filed: Dec. 29, 2017

(65) Prior Publication Data

US 2018/0188045 A1 Jul. 5, 2018

Related U.S. Application Data

(60) Provisional application No. 62/441,069, filed on Dec. 30, 2016.

(51) Int. Cl.
*G01C 21/32* (2006.01)
*G06F 16/29* (2019.01)
(Continued)

(52) U.S. Cl.
CPC ......... *G01C 21/32* (2013.01); *B60W 30/0956* (2013.01); *B60W 40/02* (2013.01);
(Continued)

(58) Field of Classification Search
CPC .... G01C 21/32; G01C 21/3635; G01C 21/30; G06K 9/00201; G06K 9/03; G06K 9/6201;
(Continued)

(56) References Cited

U.S. PATENT DOCUMENTS 8,332,242 B1 12/2012 Medina, III
8,736,463 B1 5/2014 Zhu et al.
(Continued)

FOREIGN PATENT DOCUMENTS

WO 2015/134372 A1 9/2015
WO 2016130719 A2 8/2016

OTHER PUBLICATIONS

GPS World Staff, "HERE unveils HD Live Map for highly automated driving," http://gpsworld.com, Jan. 6, 2016, 5 pages, [Online] [Retrieved on Jan. 3, 2019] Can be retrieved at URL: <https://www.gpsworld.com/here-unveils-hd-live-map-for-highly-automated-driving>.
(Continued)

*Primary Examiner* — Russell Frejd
(74) *Attorney, Agent, or Firm* — Maschoff Brennan

(57) ABSTRACT

An online system build a high definition map for geographical regions based on sensor data captured by a plurality of vehicles driving through the geographical regions. The high definition map comprises landmark map including representations of driving paths and landmarks and occupancy map comprising spatial 3D representation of the road and all physical objects around the road. The vehicles provide information to update the landmark map and the occupancy map to the online system. The vehicles detect map discrepancies based on differences in the surroundings observed using sensor data compared to the high definition map and send messages describing these map discrepancies to the online system. The online system ranks the vehicles based on factors including an upload rate of the vehicle and requests data describing high definition map from vehicles selected based on the ranking.

20 Claims, 17 Drawing Sheets

(51) Int. Cl.

| | |
|---|---|
| *G06K 9/00* | (2006.01) |
| *G06K 9/03* | (2006.01) |
| *G06K 9/62* | (2006.01) |
| *H04L 29/08* | (2006.01) |
| *H04L 29/14* | (2006.01) |
| *G01C 21/36* | (2006.01) |
| *G05D 1/00* | (2006.01) |
| *G06T 17/05* | (2011.01) |
| *B60W 30/095* | (2012.01) |
| *B60W 40/02* | (2006.01) |
| *G01C 21/30* | (2006.01) |
| *G05D 1/02* | (2020.01) |

(52) U.S. Cl.
CPC ......... *G01C 21/30* (2013.01); *G01C 21/3635* (2013.01); *G05D 1/0088* (2013.01); *G05D 1/0214* (2013.01); *G05D 1/0274* (2013.01); *G06F 16/29* (2019.01); *G06K 9/00201* (2013.01); *G06K 9/00791* (2013.01); *G06K 9/03* (2013.01); *G06K 9/6201* (2013.01); *G06K 9/6267* (2013.01); *G06T 17/05* (2013.01); *H04L 67/10* (2013.01); *H04L 67/12* (2013.01); *H04L 67/18* (2013.01); *H04L 69/40* (2013.01); *B60W 2554/00* (2020.02); *B60W 2556/50* (2020.02); *G05D 2201/0213* (2013.01); *G06K 9/00805* (2013.01); *H04L 67/20* (2013.01)

(58) Field of Classification Search
CPC ............. G06K 9/6267; G06K 9/00791; G06K 9/00805; H04L 67/10; H04L 67/18; H04L 69/40; H04L 67/12; H04L 67/20; G06F 16/29; G05D 1/0088; G05D 1/0214; G05D 1/0274; G05D 2201/0213; G06T 17/05; B60W 30/0956; B60W 40/02; B60W 2554/00; B60W 2556/50

See application file for complete search history.

(56) References Cited

U.S. PATENT DOCUMENTS

| | | |
|---|---|---|
| 9,378,601 B2 | 6/2016 | Ricci |
| 9,672,734 B1 | 6/2017 | Ratnasingam |
| 9,832,241 B1 | 11/2017 | Hayward |
| 2007/0124064 A1 | 5/2007 | Fukui et al. |
| 2009/0070379 A1 | 3/2009 | Rappaport |
| 2011/0258049 A1 | 10/2011 | Ramer et al. |
| 2012/0158746 A1 | 6/2012 | Johnson et al. |
| 2012/0179742 A1 | 7/2012 | Acharya et al. |
| 2014/0309789 A1 | 10/2014 | Ricci |
| 2014/0309864 A1 | 10/2014 | Ricci |
| 2015/0154867 A1 | 6/2015 | Tseng et al. |
| 2016/0239983 A1 | 8/2016 | Dorum et al. |
| 2017/0010617 A1 | 1/2017 | Shashua et al. |

OTHER PUBLICATIONS

PCT International Search Report and Written Opinion, PCT Application No. PCT/US2017/069104, dated May 14, 2018, 23 pages.

PCT Invitation to Pay Additional Fees and, Where Applicable, Protest Fee, PCT Application No. PCT/US2017/069104, dated Mar. 14, 2018, 3 pages.

Non-Final Office Action received in U.S. Appl. No. 15/859,014, dated Apr. 3, 2020.

GPS World, GNSS Position Navigation Timing, https://www.gpsworld.com/here-unveils-hd-live-map-for-highly-automated-driving/ retrieved on Jun. 30, 2020.

Kent, "HERE shares how automated cars can 'heal' maps on the fly", Jun. 23, 2015, XP055707904, URL: https://360.here.com/2015/06/23/here-sensor-data-ingestion.

Massow et al., "Deriving HD maps for highly automated driving from vehicular probe data", IEEE 19th International Conference on Intelligent Transportation Systems, Nov. 1, 2016, pp. 1745-1752.

European Search Report issued in corresponding application No. 17888334.4, dated Jul. 7, 2020.

HIGH DEFINITION MAP UPDATES BASED ON SENSOR DATA COLLECTED BY AUTONOMOUS VEHICLES

CROSS-REFERENCE TO RELATED APPLICATION

This application claims the benefit of U.S. Provisional Application No. 62/441,069, filed Dec. 30, 2016, which is hereby incorporated by reference in its entirety.

BACKGROUND

This disclosure relates generally to maps for autonomous vehicles, and more particularly to updating high definition maps based on sensor data collected by to autonomous vehicles.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY OF THE DISCLOSURE

Embodiments of an online system build a high definition (HD) map for a geographical region based on sensor data captured by a plurality of autonomous vehicles driving through a geographical region. The autonomous vehicles detect map discrepancies based on differences in the surroundings observed using sensor data compared to the high definition map and send messages describing these map discrepancies to the online system. The online system updates existing landmark maps to improve the accuracy of the landmark maps (LMaps), and to thereby improve passenger and pedestrian safety. This is because the physical environment is subject to change, and measurements of the physical environment may contain errors. For example, landmarks such as traffic safety signs may change over time, including being moved or removed, being replaced with new, different signs, being damaged, etc. While vehicles are in motion, they can continuously collect data about their surroundings via their sensors that may include landmarks in the environment. This sensor data, in addition to vehicle operation data, data about the vehicle's trip, etc. is collected and stored locally. When new data is available from the various vehicles within a fleet, this is passed to the online HD map system (e.g., in the cloud) for updating the landmark map, and the updated map is stored in the cloud. As new versions of the map become available, these or portions of them are pushed to the vehicles in the fleet for use while driving around. The vehicles verify the local copies of the landmark maps, and the online system updates the landmark maps based on the verification results.

In some implementations, the vehicles analyze the verification results, determine whether the existing landmark maps should be updated based on the verification results, and send information to the online system for use to update the existing landmark maps. The online system uses the information to update the existing landmark maps stored there. In some implementations, the vehicles send summaries of the verification results to the online system, the online system analyzes the summaries of the verification results to determine whether the existing landmark maps should be updated, requests information needed to update the existing landmark maps from the vehicles, and updates the existing landmark maps using the requested information.

BRIEF DESCRIPTION OF THE DRAWINGS

Figure (FIG. 1 shows the overall system environment of an HD map system interacting with multiple vehicle computing systems, according to an embodiment.

Figure 1:
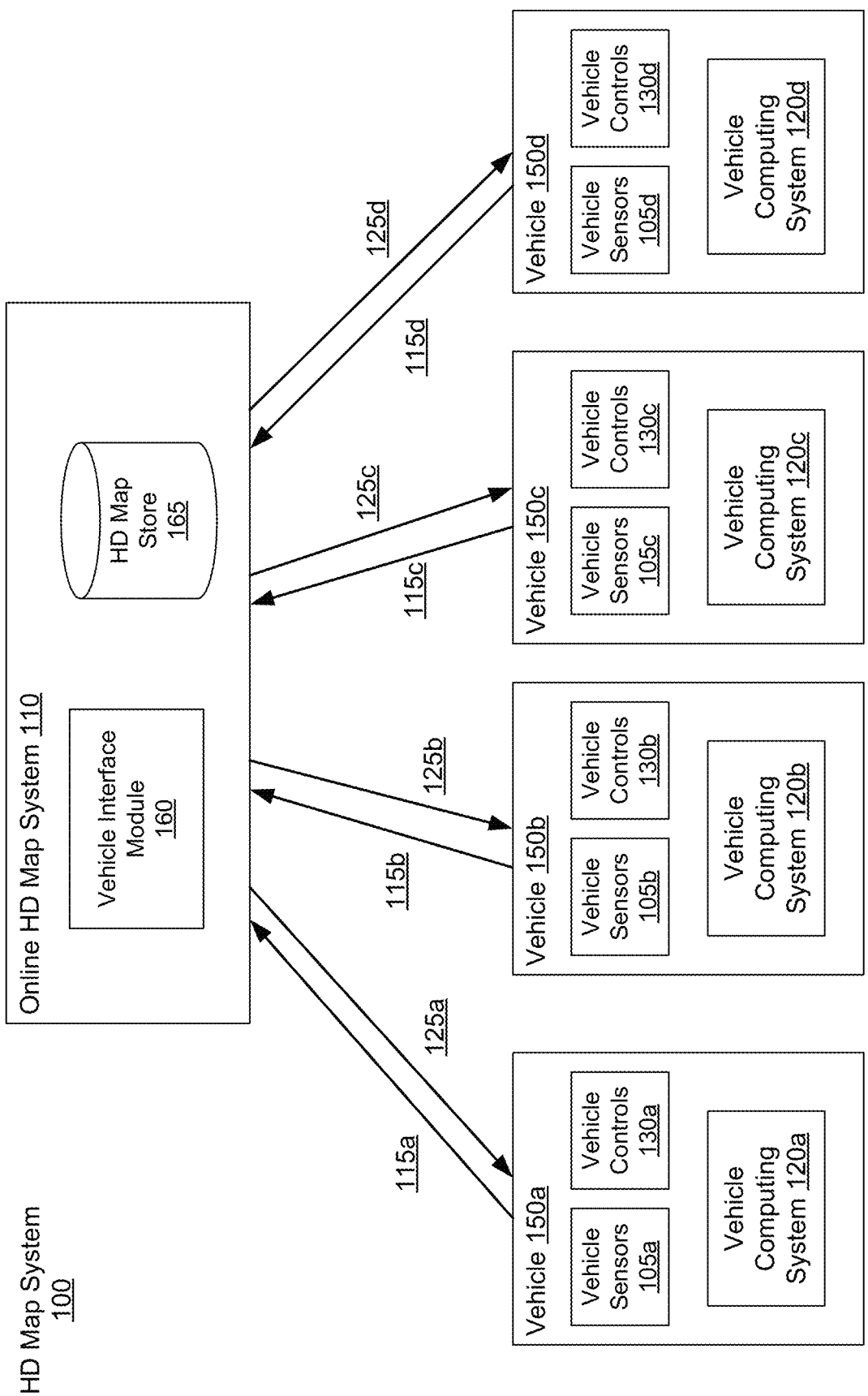

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing low latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
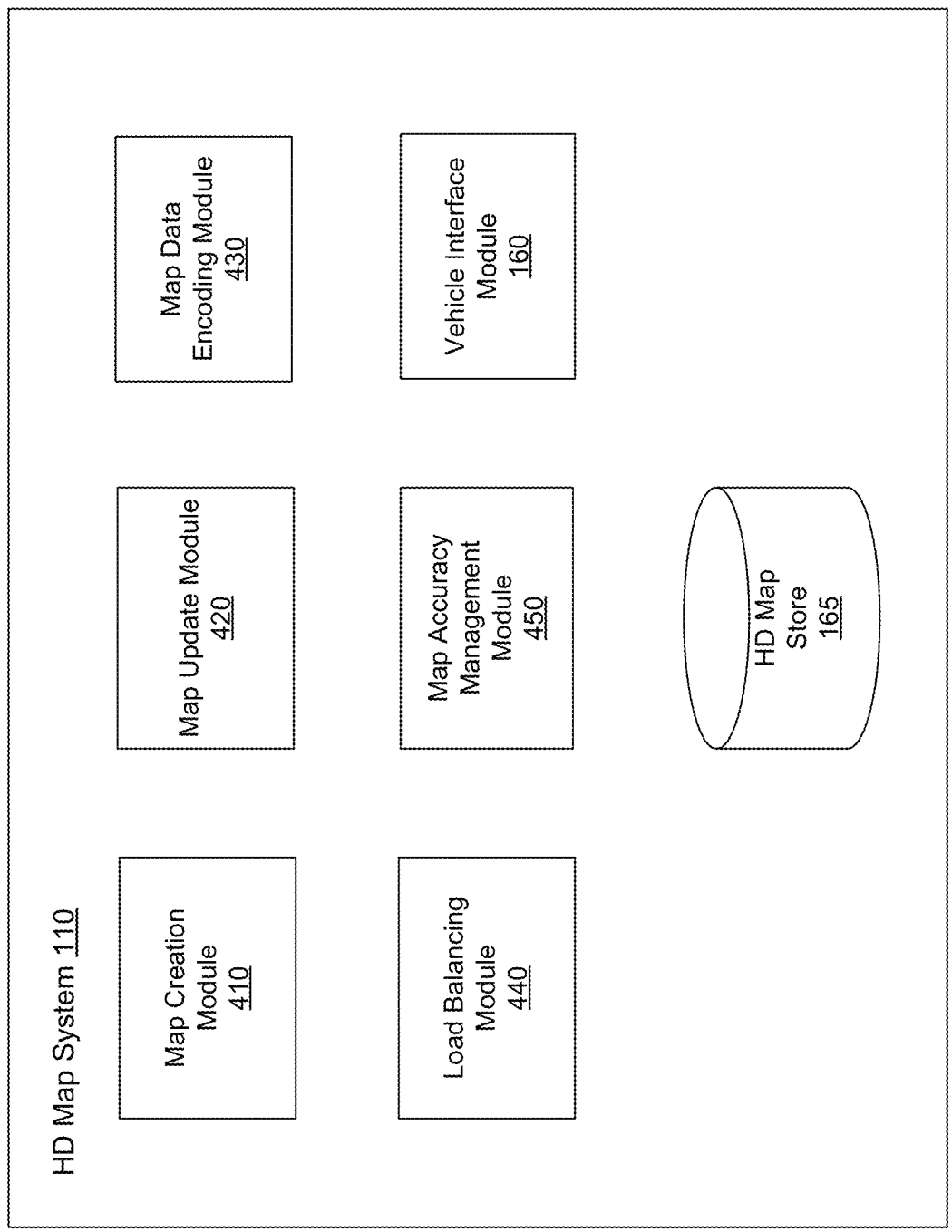
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being traveled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, for example, to address a map discrepancy, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
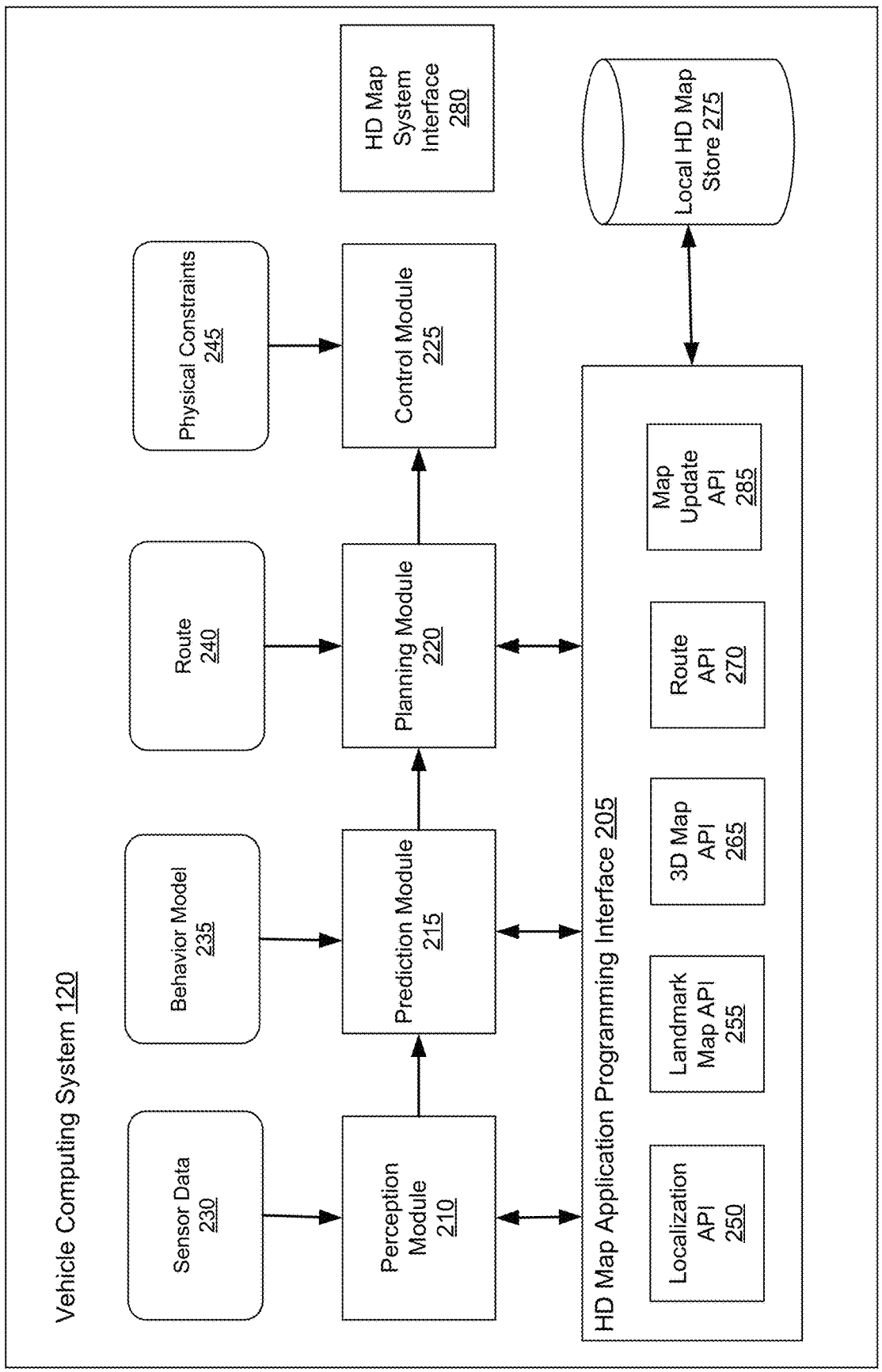
FIG. 2 shows the system architecture of a vehicle computing system, according to an embodiment.

FIG. 2 shows the system architecture of a vehicle computing system, according to an embodiment. The vehicle computing system 120 comprises a perception module 210, a prediction module 215, a planning module 220, a control module 225, a local HD map store 275, an HD map system interface 280, a map discrepancy module 290, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras, a LIDAR, an IMU, a GPS navigation system of the car, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 220 to plan the subsequent actions that the vehicle needs to take next.

The planning module 220 receives the information describing the surroundings of the vehicle from the prediction module 215, the route 240 that determines the destination of the vehicle, and the path that the vehicle should take to get to the destination. The planning module 220 uses the information from the prediction module 215 and the route 240 to plan a sequence of actions that the vehicle needs to take within a short time interval, for example, within the next few seconds. In an embodiment, the planning module 220 specifies the sequence of actions as one or more points representing nearby locations that the vehicle needs to drive through next. The planning module 220 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 220. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The map discrepancy module 290 works with the map update API 285 to determine map discrepancies and communicate map discrepancy information to the online HD map system 110. Determining map discrepancies involves comparing sensor data 230 of a particular location to HD map data for that particular location. For example, HD map data may indicate that a lane of a freeway should be usable by the vehicle 150, but sensor data 230 may indicate there is construction work occurring in that lane which has closed it from use. Upon detecting a map discrepancy, the vehicle 150 sends an update message to the online HD map system 110 comprising information regarding the map discrepancy. The map discrepancy module 290 may construct the update message, which may comprise a vehicle identifier (ID), one or more timestamps, a route traveled, lane element IDs of lane elements traversed, a type of discrepancy, a magnitude of discrepancy, a discrepancy fingerprint to help identify duplicate discrepancy alert messages, a size of message, and so on. In an embodiment, this is instead at least partially handled by a map data collection module 460 as detailed below.

Depending upon the embodiment, the vehicle may send an update message upon detection of a map discrepancy and/or periodically. For example, the vehicle 150 may record discrepancies and report them to the server via update message every 10 miles. The online HD map system 110 manages the update messages and prioritizes them, as described in more detail with reference to map data collection module 460 below. In an embodiment, the vehicle sends update messages only upon reaching or docking at high bandwidth access points, at which time it will send either a collated update message or a set of update messages, comprising update messages constructed since the last high bandwidth access point was reached or docked at. In an embodiment, upon receiving a confirmation message that the collated update message or one or more update messages were received by the online HD map system 110, the vehicle 150 marks the data for deletion to schedule a local delete process and/or deletes the data. Alternatively, the vehicle may report to the server periodically based on time, such as every hour.

The map discrepancy module 290 acts in response to messages from the online HD map system 110 as well. For example, upon receiving a message requesting data about a particular location along the vehicle's 150 route, the map discrepancy module 290 instructs vehicle sensors 105 to collect and report that data to the map discrepancy module 290. Upon receipt of the data, the map discrepancy module 290 constructs a message containing the data and sends it to the online HD map system 110, either immediately, at the next scheduled time of a periodic schedule, or at the next high bandwidth access point, depending upon the embodiment.

The map discrepancy module 290 may determine a degree of urgency of the determined map discrepancy. For example, there may be two degrees of urgency, those being low urgency and high urgency. The online HD map system 110 may consider the degree of urgency of an update message when determining how to process it, as detailed below with regard to map data collection module 460. For example, a single lane closure on a desert backroad may be determined to have low urgency, whereas total closure of a major highway in a city of one million people may be determined to have high urgency. High urgency update messages may be handled by the online HD map system 110 before low urgency update messages.

In an embodiment, the vehicle 150 continually records sensor data 230 and encodes relevant portions for messages to the online HD map system 110 such as in response to requests for additional data of specific locations. In an embodiment, the vehicle only deletes continually recorded sensor data upon confirmation from the online HD map system 110 that none of the sensor data is needed by the online HD map system.

Figure 3:
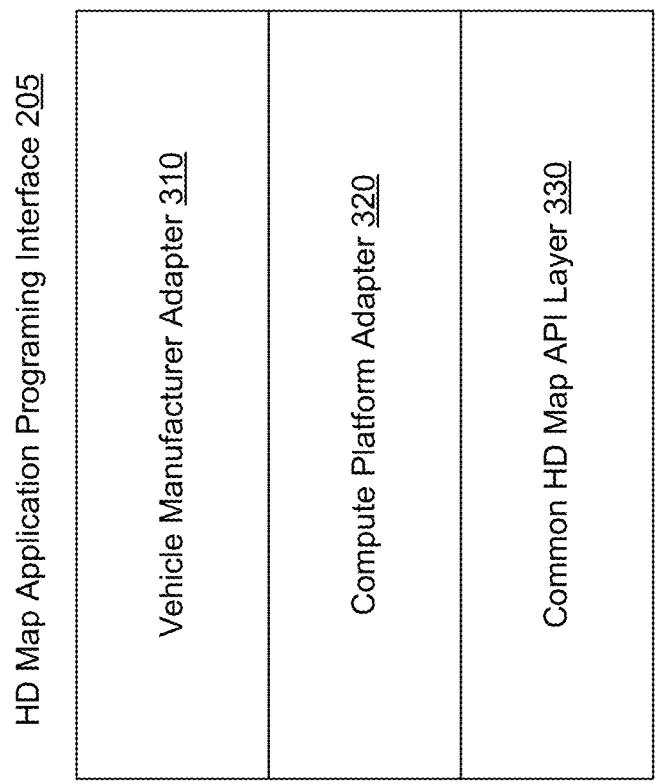
FIG. 3 illustrates the various layers of instructions in the HD Map API of a vehicle computing system, according to an embodiment.

FIG. 3 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module 450, a vehicle interface module 160, the map data collection module 460, and an HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently traveled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy. The map data collection module 460 monitors vehicles and processes status updates from vehicles to determine whether to request certain vehicle for additional data related to particular location. Details of the map data collection module 460 are further described in connection with FIG. 13.

Figure 5:
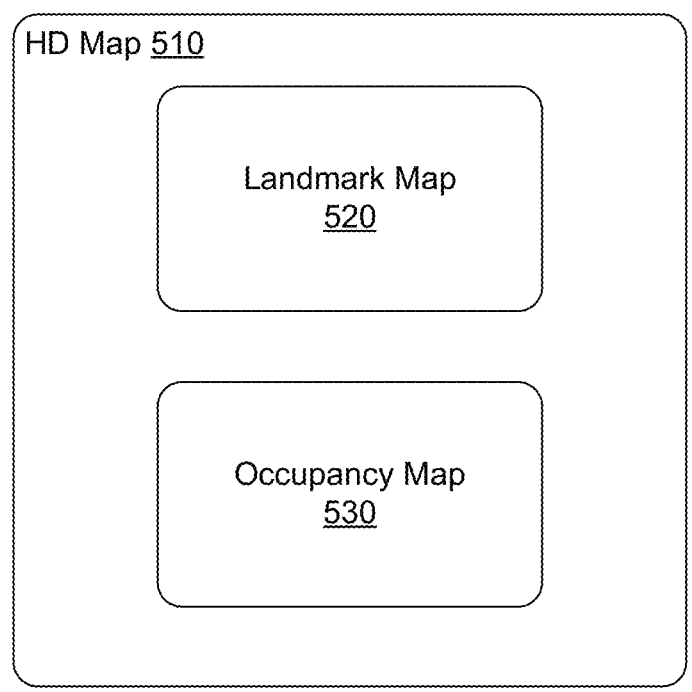
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map includes representations of driving paths (e.g., lanes, yield lines, safely navigable space, driveways, unpaved roads, etc.), pedestrian paths (e.g., cross walks, sidewalks, etc.), and landmark objects (e.g., road signs, buildings, etc.) For example, the landmark map comprises information describing lanes including spatial location of lanes and semantic information about each lane. The spatial location of a lane comprises the geometric location in latitude, longitude and elevation at high precision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include traffic signs, stop signs, traffic lights, speed limits, one-way, do-not-enter, yield (vehicle, pedestrian, animal), and so on.

The information included in a landmark map is associated with a confidence value measuring a probability of a representation being accurate. A representation of an object is accurate if information describing the object matches attributes of the object (e.g., a driving path, a pedestrian path, a landmark object). For example, if spatial location and semantic information of a driving path matches attributes (e.g., physical measurements, restrictions, etc.) of the driving path, then the representation of the driving path is considered to be accurate. The vehicle computing system 120 (e.g., the planning module 220) may use the confidence value to control the vehicle 150. For example, if a representation of a landmark object is associated with a high confidence value in the landmark map but the vehicle 150 does not detect the landmark object based on the vehicle's own observation of its environment, the vehicle computing system 120 controls the vehicle 150 to avoid the landmark object that is presumed to be present based on the high confidence value, or controls the vehicle 150 to follow driving restrictions imposed by the landmark object (e.g., causes the vehicle to yield based on a yield sign on the landmark map).

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
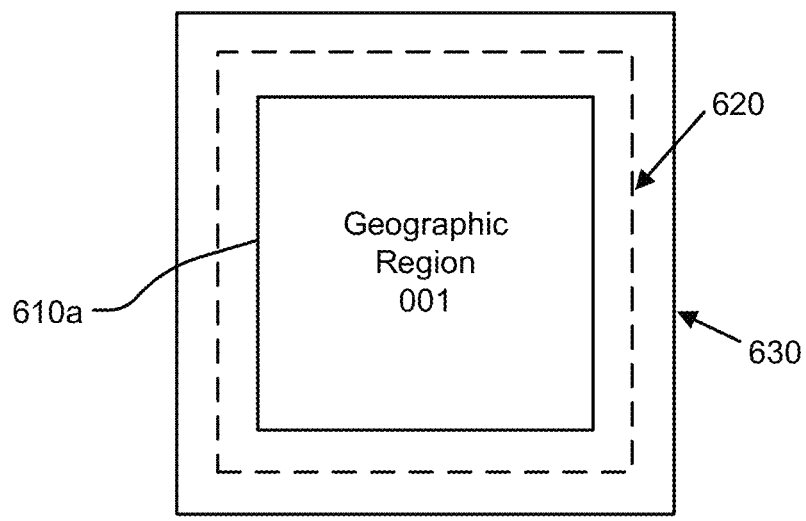
FIGS. 6A-B illustrate geographical regions defined in an HD map, according to an embodiment.
Figure 6B:
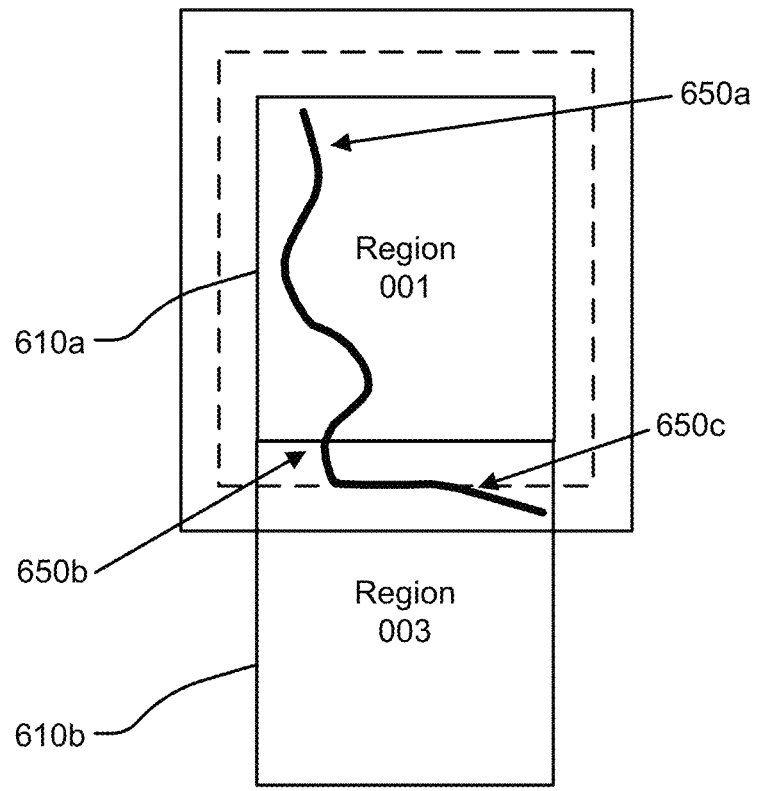

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
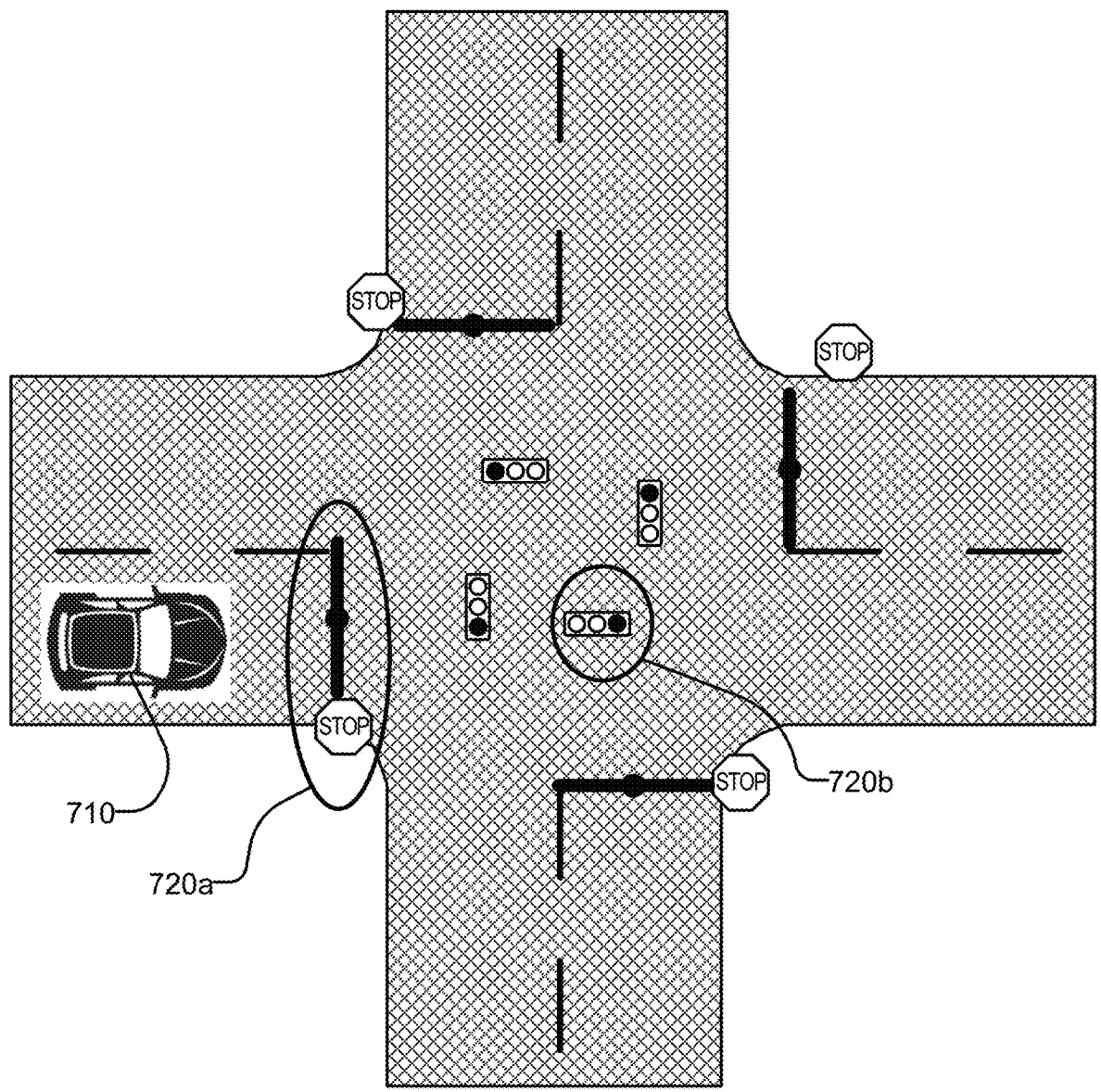
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
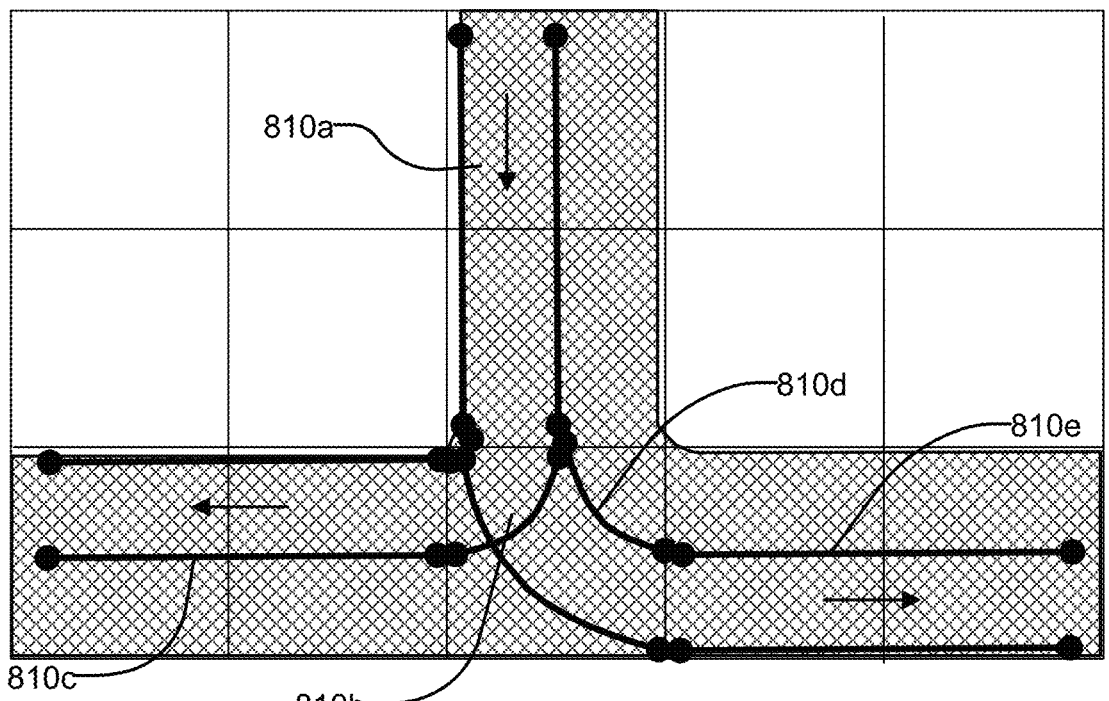
FIGS. 8A-B illustrates lane elements and relations between lane elements in an HD map, according to an embodiment.
Figure 8B:
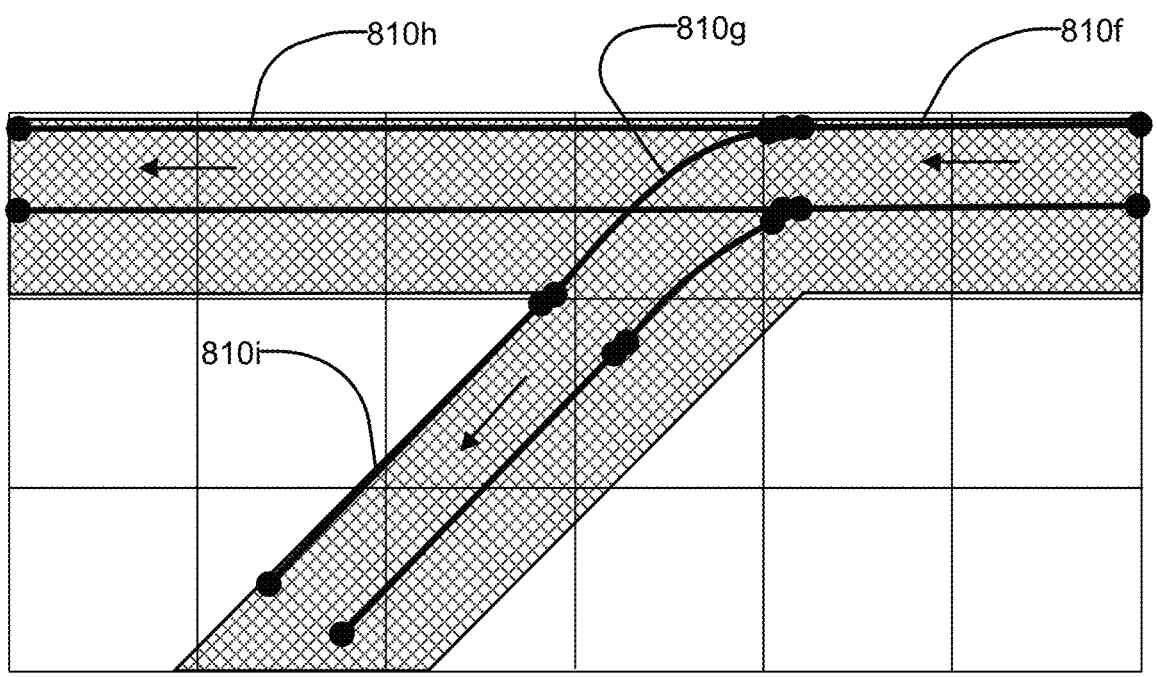

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Landmark Map Update

As described previously, the map update module 420 updates existing landmark maps to improve the accuracy of the landmark maps, and to thereby improve passenger and pedestrian safety. This is because the physical environment is subject to change, and measurements of the physical environment may contain errors. For example, landmarks such as traffic safety signs may change over time, including being moved or removed, being replaced with new, different signs, being damaged, etc. While vehicles are in motion, they can continuously collect data about their surroundings via their sensors that may include landmarks in the environment. This sensor data, in addition to vehicle operation data, data about the vehicle's trip, etc. is collected and stored locally. When new data is available from the various vehicles within a fleet, this is passed to the online HD map system (e.g., in the cloud) for updating the landmark map, and the updated map is stored in the cloud. As new versions of the map become available, these or portions of them are pushed to the vehicles in the fleet for use while driving around. The vehicles 150 verify the local copies of the landmark maps, and the online HD map system 100 updates the landmark maps based on the verification results.

In some implementations, the vehicles 150 analyze the verification results, determine whether the existing landmark maps should be updated based on the verification results, and send information to the online HD map system 100 for use to update the existing landmark maps. The online HD map system 100 uses the information to update the existing landmark maps stored there. In some implementations, the vehicles 150 send summaries of the verification results to the online HD map system 100, the online HD map system 100 analyzes the summaries of the verification results to determine whether the existing landmark maps should be updated, requests information needed to update the existing landmark maps from the vehicles 150, and updates the existing landmark maps using the requested information.

Figure 9:
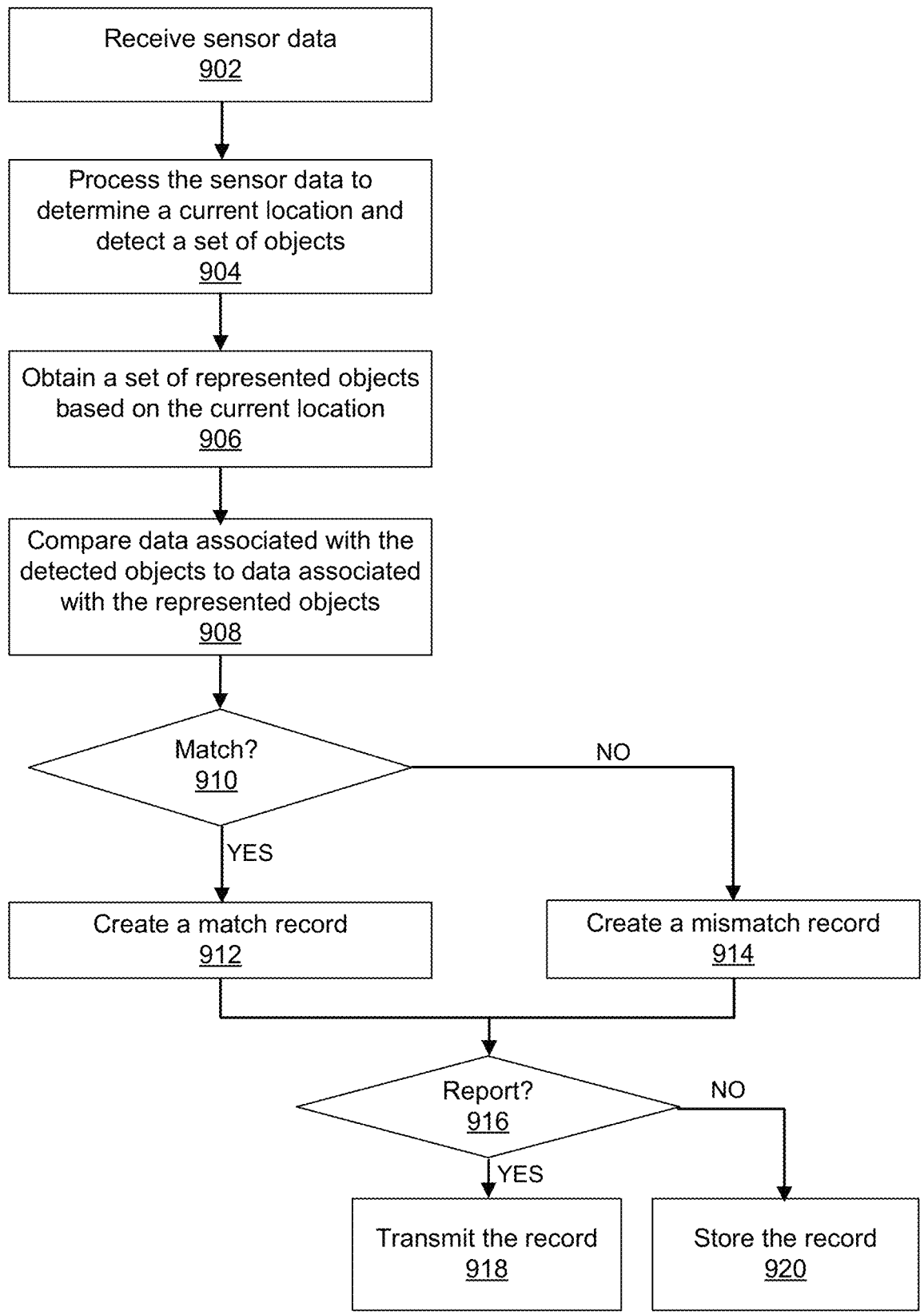
FIG. 9 is a flow chart illustrating an example process of a vehicle verifying existing landmark maps, according to an embodiment.

FIG. 9 is a flow chart illustrating an example process of a vehicle 150 verifying existing landmark maps, according to one embodiment. The vehicle 150 receives 902 sensor data from the vehicle sensors 105 concurrently with the vehicle 150 traversing along a route. As described previously, the sensor data (e.g., the sensor data 230) includes, among others, image data, location data, vehicle motion data, and LIDAR scanner data.

The vehicle 150 processes 904 the sensor data to determine a current location of the vehicle 150, and detects a set of objects (e.g., landmarks) from the sensor data. For example, the current location may be determined from the GPS location data. The set of objects may be detected from the image data and the LIDAR scanner data. In various embodiments, the vehicle 150 detects the objects in a predetermined region surrounding the vehicle's current location. For each determined object, the vehicle 150 may also determine information associated with the object such as a distance of the object away from the current location, a location of the object, a geometric shape of the object, and the like. The vehicle 150 (e.g., the perception module 210 on the vehicle that was described above) applies various signal processing techniques to analyze the sensor data.

The vehicle 150 obtains 906 a set of represented objects (e.g., landmarks represented on the LMap) based on the current location of the vehicle. For example, the vehicle 150 queries its current location in the HD map data stored in the local HD map store 275 on the vehicle to find the set of represented objects located within a predetermined region surrounding the vehicle's current location. The HD map data stored in the on-vehicle or local HD map store 275 corresponds to a geographic region and includes landmark map data with representations of landmark objects in the geographic region. The representations of landmark objects include locations such as latitude and longitude coordinates of the represented landmark objects. The HD map data stored in the local HD map store 275 is generally a copy of a particular version of the existing map information (or a portion of the existing map information) that is stored in the HD map store 165. By querying its current location from local HD map data, the vehicle 150 identifies objects present in its environment, which are also represented in landmark maps stored at the online system (e.g., in the cloud within the HD map store 165).

The vehicle 150 compares 908 data associated with the objects detected by the vehicles to data associated with the objects on the maps to determine any discrepancies between the vehicle's 150 perception of its environment (i.e., the physical environment corresponding to the predetermined region) and the representation of the environment that is stored in the HD map store 165. The vehicle 150 may compare location data and geometric shape data of the detected objects to location data and geometric shape data of the represented objects. For example, the vehicle 150 compares the latitude and longitude coordinates of detected traffic signs to latitudes and longitudes of traffic signs on the map to determine any matches. For each matched latitude and longitude coordinates, the vehicle 150 compares the geometric shape of the detected object (e.g., a hexagonal stop sign) to the geometric shape of the object on the map. Alternatively, the shapes can be matched without first matching coordinates. And then, for each matched geometric shape, the vehicle 150 compares the latitude and longitude coordinates between the objects.

The vehicle 150 determines 910 if there are any matches between the objects it detected and those on the map based on the comparison. The vehicle 150 determines that there is a match if the location data and the geometric shape data of a detected object matches the location data and the geometric shape data of a represented object, respectively. As described herein, a match refers to a difference between data being within a predetermined threshold.

The vehicle 150 creates 912 a match record. A match record is a type of a landmark map verification record. A match record corresponds to a particular represented object in the landmark map stored in the local HD map store 275 that is determined to match an object detected by the vehicle, which can be referred to as "a verified represented object." The match record includes the current location of the vehicle 150 and a current timestamp. The match record may also include information about the verified represented object, such as an object ID identifying the verified represented object that is used in the existing landmark map stored in the HD map system HD map store 165. The object ID may be obtained from the local HD map store 275. The match record may further include other information about the vehicle (e.g., a particular make and model, vehicle ID, a current direction (e.g. relative to north), a current speed, a current motion, etc.) A match record may also include the version (e.g., a version ID) of the HD map that is stored in the local HD map store 275.

In some embodiments, the vehicle 150 creates match records only for verified represented objects of which the associated confidence value is below a predetermined threshold value. The associated confidence value can be obtained from the local HD map store 275.

In some embodiments, the vehicle 150 further verifies operations of the objects. For example, some objects display information or transmit wireless signals including the information to vehicles 150 according to various communication protocols. For example, certain traffic lights or traffic signs have communication capabilities, and can transmit data. The data transmitted by this type of traffic light affects the vehicle's 150 determination of the sequence of actions to take (e.g., stop, slow down, or go). The vehicle can compare the traffic light or traffic sign with a live traffic signal feed from the V2X system to determine if there is a match. If there is not a match with the live traffic signal feed, then the vehicle may adjust how it responds to this landmark. In some cases, the information sent from the object (e.g., traffic light, traffic sign) may be dynamically controlled, for example, based on various factors such as traffic condition, road condition, or weather condition. For example, the vehicle 150 processes the image data of the of the traffic sign to detect what is displayed on it, and processes the wireless signals from the sign to obtain wirelessly-communicated information from the sign, and compares these, and responds based on whether there is a match. If the displayed information does not match the wirelessly-communicated information, the vehicle 150 determines that the verification failed and disregards the information when determining what actions to take.

In some embodiments, if the operation verification fails for the first time, the vehicle 150 may repeat the verification process by obtaining an updated wireless signal and making another comparison. The vehicle 150 may repeat the verification process for a predetermined number of times or for a predetermined time interval before determining that the verification failed. The vehicle 150 associates the operation verification result with the match record created for the object.

The vehicle 150 may classify a verified represented object into a particular landmark object type (e.g., a traffic light with wireless communication capability, a traffic sign with wireless communication capability) to determine whether to verify operations of the verified represented object. This is because not all landmark objects' operations need to be verified. To make the classification, the vehicle 150 may determine whether any wireless signal is received from a particular represented object or obtain the classification from the HD map data stored in the local HD map store 275. Moreover, the vehicle 150 may also apply machine learning algorithms to make the classification. Alternatively, the vehicle 150 may provide the object and associated data (e.g., location data, geometric shape data, image data, etc.) to the online HD map system 110 or a third-party service for classification.

The vehicle 150 may further determine whether the operation verification failure is caused by various types of errors (e.g., sensor errors, measurement errors, analysis errors, classification errors, communication errors, transmission errors, reception errors, and the like.) That is, the vehicle 150 performs error control (i.e., error detection and correction). The errors may cause misperception of the environment surrounding the vehicle 150 such as a misclassification of an object or a misidentification of the displayed information. The errors may also cause miscommunication between the vehicle 150 and another device such as the verified represented object. If the vehicle 150 removes the detected errors, the vehicle 150 may re-verify the operation of the verified represented object (e.g., using recovered original information and/or using recovered displayed information) or determine that the operation verification is unnecessary (e.g., the object is of a particular type that does not transmit wireless signals). If the vehicle 150 does not remove the detected errors, the vehicle 150 includes an indication to indicate that the failure may be caused by errors in the operation verification result. The vehicle may also include detected errors and/or error types in the operation verification result.

In some embodiments, the vehicle 150 may further determine a likelihood of the operation verification failure being caused by errors and include the likelihood in the operation verification result. The vehicle 150 may remove the operation verification failure result if the likelihood is above a threshold likelihood.

The vehicle 150 determines that there is a mismatch if the location data and the geometric shape data of an object detected by the vehicle (or an object on the map) does not match the location data and geometric shape data of any object on the map (or any object detected by the vehicle.) The vehicle 150 creates 914 a mismatch record. A mismatch record is another type of a landmark map verification record. A mismatch record can be of two types. A first type of a mismatch record corresponds to a particular detected object that is determined not to match any object represented in the landmark map stored in the local HD map store 275 (hereinafter referred to as "an unverified detected object"). A second type of a mismatch record corresponds to a particular represented object in the landmark map stored in the local HD map store 275 that is determined not to match any detected object (referred to as "an unverified represented object"). A mismatch record includes a mismatch record type, the current location (e.g., latitude and longitude coordinates) of the vehicle 150, and a current timestamp. A mismatch record is associated with raw sensor data (e.g., raw sensor data related to the unverified detected object or its location). The second type of mismatch record includes information about the unverified represented object such as an object ID identifying the unverified represented object that is used in the existing landmark map stored in the HD map system HD map store 165. The object ID may be obtained from the local HD map store 275. A mismatch record may further include other information about the vehicle (e.g., a particular make and model, vehicle ID, a current direction (e.g. relative to north), a current speed, a current motion, etc.) A mismatch record may also include the version (e.g., a version ID) of the HD map that is stored in the local HD map store 275.

The vehicle 150 may further determine whether the mismatch is caused by various types of errors (e.g., sensor errors, measurement errors, analysis errors, classification errors, communication errors, transmission errors, reception errors, and the like.) That is, the vehicle 150 performs error control (i.e., error detection and correction). The errors may cause misperception of the environment surrounding the vehicle 150 such as a misdetection of an object, a misdetermination of a location and/or geometric shape of an object, and the like. The errors may also cause the version of the HD map stored in the local HD map store 275 not to match the same version of the HD map that is stored in the HD map store 165. If the vehicle 150 removes the detected errors, the vehicle 150 may re-verify an unverified detected object or an unverified represented object. If the vehicle 150 does not remove the detected errors, the vehicle 150 indicates that the failure may be caused by errors in the mismatch record. The vehicle may also include detected errors and/or error types in the operation verification result.

In some embodiments, the vehicle 150 may further determine a likelihood of the mismatch being caused by errors and include the likelihood in the mismatch record. The vehicle 150 may remove the mismatch record if the likelihood is above a threshold likelihood.

In some embodiments, the vehicle 150 creates mismatch records only for unverified represented objects of which the associated confidence value is below a predetermined threshold value. The associated confidence value can be obtained from the local HD map store 275.

For each created landmark map verification record, the vehicle 150 determines 916 whether to report the record. The vehicle 150 may report landmark map verification records periodically. For example, the vehicle 150 reports verification records every predetermined time interval. As another example, the vehicle 150 reports verification records when the number of total verification records reaches a threshold. The vehicle 150 may report a verification when the verification record is created. The vehicle 150 may also report verification records in response to requests for verification records received from the online HD map system 110. The online HD map system 100 may periodically send requests for verification records to vehicles 150, for example, vehicles 150 that are located in a particular geographic region. The online HD map system 100 may send requests for verification records to vehicles 150 based on summaries received from the vehicles 150. For example, the online HD map system 100 analyzes one or more summaries received from one or more vehicles to identify one or more verification records and sends a request for the identified verification records to corresponding vehicle(s) that create the identified verification records. The one or more vehicles may be located in a particular geographic region. A summary of verification records may include statistical information such as a number of times that a represented object is verified, a number of times that a represented object is not verified, a number of times of a detected object at a particular location is not verified, and the like. A vehicle 150 may create a summary of unreported verification records periodically or in response to an online HD map system's 110 request.

The vehicle 150 transmits 916 one or more verification records that are determined to be reported to the online HD map system 110. The vehicle 150 may send raw sensor data used when creating a mismatch record along with the mismatch record to the online HD map system 110. The vehicle 150 removes a verification record after transmitting the verification record to the online HD map system 110. Alternatively, the vehicle 150 may store the verification record locally for a predetermined time period.

The vehicle 150 stores 920 unreported verification records if it determines not to report those verification records. In some embodiments, the vehicle removes the unreported verification records after a predetermined time period.

Figure 10:
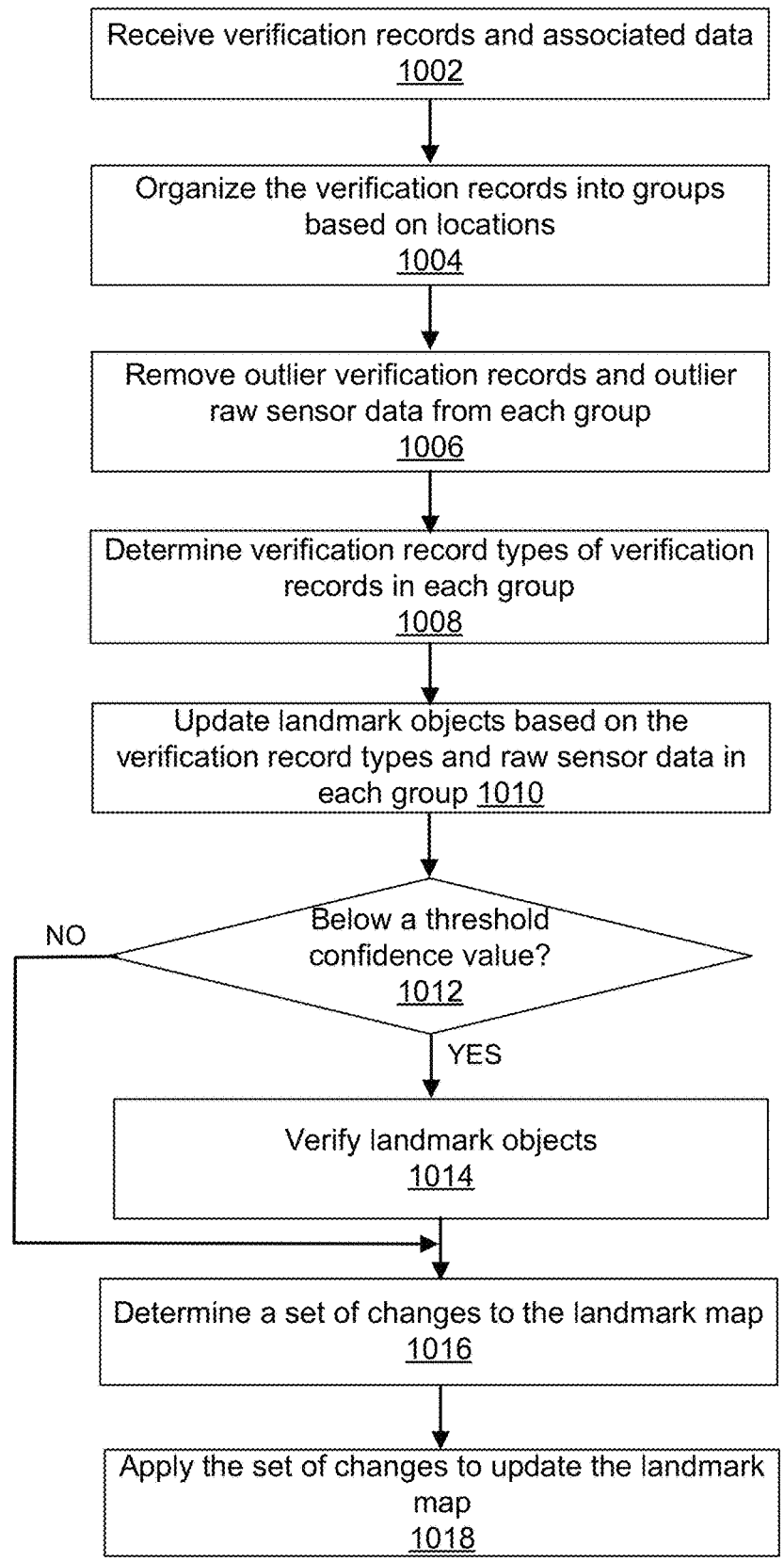
FIG. 10 is a flow chart illustrating an example process of an online HD map system updating existing landmark maps, according to an embodiment.

FIG. 10 is a flow chart illustrating an example process of an online HD map system 110 (e.g., the map update module 420) updating existing landmark maps, according to one embodiment. The online HD map system 110 receives 1002 verification records and associated data (e.g., raw sensor data) from vehicles 150. As described previously with respect to FIG. 9, the online HD map system 110 may receive verification records from the vehicles 150 continuously over time. At a particular time point, the online HD map system 110 may receive verification records from some but not all vehicles 150, including from vehicles that may be distributed across different geographic regions that correspond to different regions of the HD map 510.

In some embodiments, the online HD map system 110 collects the verification records over a time interval and then processes the verification records to update the HD map 510. The time interval may be predetermined or adjusted based on the number of verification records received at each time point.

The online HD map system 110 organizes 1004 the verification records into groups based on locations (e.g., latitude and longitude coordinates). The locations can be determined from a current location of the vehicle included in each verification record. Each group corresponds to a geographic area and includes verification records for a location within the geographic area. The geographic area may be predetermined or dynamically determined based on the verification records received. For example, the online HD map system 110 determines geographic areas such that each group includes substantially the same number of verification records.

The online HD map system 110 removes 1006 outlier verification records and outlier raw sensor data. An outlier verification record is a verification record for which the verification result is inconsistent with other verification records for a particular location. For example, for a particular location, if 12 verification records are mismatch records and 1877 verification records are match records, the mismatch records are outlier verification records. If one copy of raw sensor data for a particular location is distant from other copies of raw sensor data for the same location, then this particular copy is an outlier. The online HD map system 110 removes any identified outlier verification records as well as any identified outlier raw sensor data. For a particular group verification records, the online HD map system 110 identifies outlier verification records and/or outlier raw sensor data, if any. The online HD map system 110 may apply data outlier detection techniques such as density-based techniques, subspace-based outlier detection, replicator neural networks, cluster analysis-based outlier detection, and the like to identify outlier verification records and outlier raw sensor data. Outlier verification records and outlier sensor data are likely to be caused by errors. By removing both of these, the online HD map system 110 improves the reliability as well as the accuracy of the HD maps.

For each group, the online HD map system 110 determines 1008 verification record types of verification records included in the group. A verification record can be a match record, a mismatch record of a first type, or a mismatch record of a second type.

For each group, the online HD map system 110 updates 1010 landmark objects based on the verification record types and raw sensor data in the group. For example, the online HD map system 110 increases the confidence value associated with each landmark object that corresponds to one or more match records. The online HD map system 110 decreases the confidence value associated with each landmark object that corresponds to one or more mismatch records of the second type. The amount of confidence value adjustment can be determined based on various factors such as the original confidence value associated with a landmark object, a location of the landmark object, a geographic region (e.g., an urban area, a suburban area, etc.) where the landmark object is located, the number of match records or mismatch records to which the landmark object corresponds, and the like. For one or more mismatch records of the first type that correspond to an unverified detected object at a particular location, the online HD map system 110 analyzes the raw sensor data associated with the mismatch records to detect the landmark object that is not represented in the landmark map 520. The HD map system 110 may further classify the detected landmark object. The online HD map system 110 determines a confidence value for the detected object using the associated raw sensor data.

For each landmark object, the HD map system 110 determines 1012 whether the confidence value associated with the landmark object is below a threshold confidence value. The HD map system 110 uses different threshold confidence values for different landmark objects. The HD map system 110 determines a particular threshold confidence value based on various factors such as the amount of confidence value adjustment, the location of the landmark object, the type of the landmark object (e.g., traffic signs, road signs, etc.), the geographic region (e.g., an urban area, a suburban area, etc.) where the landmark object is located, threshold values that different vehicles 150 use for determining sequences of actions, and the like. For example, a threshold confidence value for a traffic control landmark object is typically higher than a threshold confidence value for a road sign landmark object, because misrepresentation of traffic control landmark objects is more likely to cause accidents than misrepresentation of road sign landmark objects.

If the confidence value is below the threshold confidence value, the HD map system 110 verifies the corresponding landmark object. The verification can be performed in several ways. The HD map system 110 may analyze raw sensor data collected related to the particular landmark object and the landmark object as represented in the HD map 110 to verify whether the landmark object as presented in the HD map 110 is accurate or should be updated. The HD map system 110 may also notify a human reviewer for verification. The human operator can provide to the HD map system 110 with instructions on whether the landmark object as represented in the HD map 110 should be updated or is accurate. The human operator can provide specific changes that should be made to the HD map 510. The HD map system 110 may also interact with a human reviewer to verify the landmark object. For example, the HD map system 110 may notify the human reviewer to verify information that the HD map system 110 determines as likely to be inaccurate such as raw sensor data, analyses of the raw sensor data, one or more attributes of the physical object, one or more attributes of the landmark object as represented in the HD map. Based on the human reviewer's input, the HD map system 110 completes verifying whether the landmark object as represented in the HD map 510 should be updated or is accurate. After the HD map system 110 completes the verification, the HD map system 110 determines 1016 a set of changes to the HD map 510 (e.g., the landmark map 520).

The HD map system 110 determines 1016 a set of changes to the HD map 510, if the confidence value is above the threshold value. The HD map system 110 determines whether changes should be made to the landmark map 520. For example, the HD map system 110 determines whether one or more attributes (e.g., a location, a geometric shape, a semantic information) of an existing landmark object needs to be changed, whether an existing landmark object should be removed, and whether a new landmark object should be added and associated attributes. The HD map system 110 creates a change record for a particular landmark object that should be modified, added, or removed. The HD map system 110 associates the change record with a timestamp, change specifics (e.g., an attribute change, removal, addition), a change source (e.g., whether the change is requested by a human viewer, a human reviewer ID, whether the change is determined by an algorithm, the algorithm ID, etc.), input provided by a human reviewer, a data source (e.g., a vehicle 150 that provides the verification records, a vehicle that provides the raw sensor data, sensors associated with the raw sensor data), and the like.

The HD map system 110 applies the set of changes to the HD map 510 to update the map. For example, the HD map system 100 modifies an existing landmark object, adds a new landmark object, or removes an existing landmark object according to the set of changes. The HD map system 1100 may monitor the consistency of the landmark map 510 when applying the changes. That is, the HD map system 1100 determines whether a change triggers other changes because some landmark objects are interdependent. For instance, when adding a left-turn sign, the HD map system 1100 creates a LaneEl to connect with the LaneEl of the left-turn target. Conversely, such a LaneEl might be removed when the corresponding left-turn sign is removed or a sign prohibiting left-turn is detected. The consistency maintenance may be performed on a per-change basis or on a per-region basis. When performing on the per-region basis, the HD map system 110 waits until all individual landmark object changes within a region are complete. Based on the locations of the changes, the HD map system 110 determines the maximum impact region of affected landmark objects (since LaneEl has a max length) and updates all landmark objects within this impact region (potentially add/remove LaneEl as needed).

Occupancy Map Update

As described previously, the map update module 420 updates existing occupancy maps to improve the accuracy of the occupancy maps thereby to improve passenger and pedestrian safety. This is because the physical environment is subject to change and measurements of the physical environments may contain errors. In various embodiments, the online HD map system 110 verifies the existing occupancy maps and updates the existing occupancy maps. If an object (e.g., a tree, a wall, a barrier, a road surface) moves, appears, or disappears, then the occupancy map is updated to reflect the changes. For example, if a hole appears in a road, a hole has been filled, a tree is cut down, a tree grows beyond a reasonable tolerance, etc, then the occupancy map is updated. If an object's appearance changes, then the occupancy map is updated to reflect the changes. For example, if a road surface's reflectance and/or color changes under different lighting conditions, then the occupancy map is updated to reflect the changes.

As further described below, the online HD map system 100 distributes copies of the existing occupancy maps or a portion thereof to vehicles 150 and the vehicles 150 verify the local copies of the existing occupancy maps or the portion thereof. The online HD map system 100 updates the occupancy maps based on the verification results. In some implementations, the vehicles 150 analyzes the verification results, determines whether the existing occupancy maps should be updated based on the verification results, and sends information to the online HD map system 100 for use to update the existing occupancy maps. The online HD map system 100 uses the received information to update the existing landmark maps. In some implementations, the vehicles 150 send summaries of the verification results to the online HD map system 100, the online HD map system 100 analyzes the summaries of the verification results to determine whether the existing occupancy maps should be updated, requests information needed to update the existing occupancy maps from the vehicles 150, and updates the existing occupancy maps using the requested information.

Figure 11A:
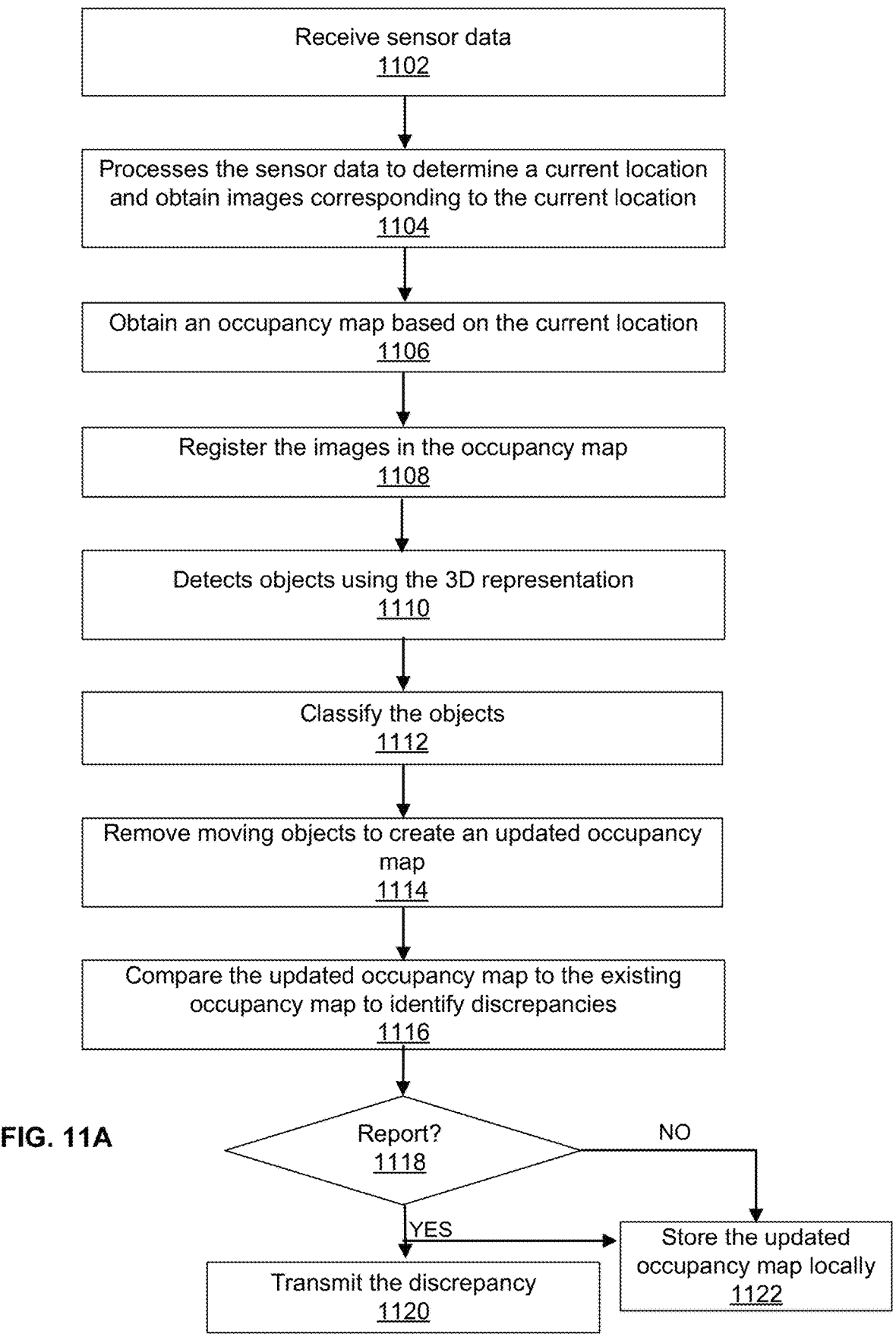
FIG. 11A is a flow chart illustrating an example process of a vehicle verifying and updating existing occupancy maps, according to one embodiment.

FIG. 11A is a flow chart illustrating an example process of a vehicle 150 verifying and updating existing occupancy maps, according to one embodiment. The vehicle 150 receives 1102 sensor data from the vehicle sensors 105. The vehicle 150 receives the sensor data concurrently with the vehicle 150 traveling along a route. As described previously, the sensor data (e.g., the sensor data 230) includes, among others, image data, location data, vehicle motion data, and LIDAR scanner data.

The vehicle 150 processes 1104 the sensor data to determine a current location of the vehicle 150 and obtain images from the sensor data. The images capture an environment surrounding the vehicle 150 at the current location from different perspectives. The environment includes roads and objects around the roads. The current location may be determined from the GPS location data or matching the sensor data to an occupancy map. The images of the surroundings and LIDAR data can be used to create a 3D representation of the surroundings. The vehicle 150 such as the perception module 210 applies various signal processing techniques to analyze the sensor data. Alternatively, the vehicle 150 may provide the sensor data to the online HD map system 110 or to a third-party service for analysis.

The vehicle 150 obtains 1106 an occupancy map based on the current location. For example, the vehicle 150 queries the current location in the HD map data stored in the local HD map store 275 to find the occupancy map of which the associated location range includes the current location or of which the associated location matches the current location. The HD map data stored in the local HD map store 275 corresponds to a geographic region and includes occupancy grid data that includes 3D representations of the roads and objects around the roads in the geographic region. By querying the current location in the HD map data stored in the local HD map store 275, the vehicle 150 identifies roads and objects that are 3D represented in existing occupancy maps stored in the HD map store 165.

The vehicle 150 registers 1108 the images of the surroundings with the occupancy map. In other words, the vehicle 150 transforms 2D image information into the 3D coordinate system of the occupancy map. For example, the vehicle 150 maps points, lines, and surfaces in the stereo images to points, lines, and surfaces in the 3D coordinate system. The vehicle 150 also registers LIDAR scanner data with the occupancy map. The vehicle 150 thereby creates a 3D representation of the environment surrounding the vehicle 150 using the images, the LIDAR scanner data, and the occupancy map. As such, the vehicle 150 creates a 3D representation of the surroundings.

In some embodiments, the vehicle 150 detects objects (e.g., obstacles) from the sensor data (e.g., the image data, the LIDAR scanner data), classifies detected objects as moving objects, and removes moving objects while creating the 3D representation of the surroundings. As such, the 3D representation of the surroundings include no moving objects. In various embodiments, the vehicle 150 detects the objects in a predetermined region surrounding the current location. For each determined object, the vehicle 150 may also determine information associated with the object such as a distance of the object away from the current location, a location of the object, a geometric shape of the object, and the like. For each detected object, the vehicle 150 classifies whether the object is a moving object or a still object. A moving object (e.g., a car, a bicycle, a pedestrian) is either moving or is likely to move. The vehicle 150 may determine a likelihood of moving for an object. If the likelihood of moving is greater than a threshold likelihood, the object is classified as a moving object. The vehicle 150 removes the moving objects from the images. That is, the vehicle 150 classifies call objects into a moving object group or a still object group. The moving object group includes moving objects and the still object group includes still objects. The vehicle 150 removes the objects included in the moving object group. The vehicle 150 such as the perception module 210 or the prediction module 215 detects and classifies objects from the sensor data. Alternatively, the vehicle 150 may provide the sensor data to the online HD map system 110 or to a third-party service for analysis.

If the vehicle 150 registration of the images and the LIDAR scanner data with the occupancy map fails, the vehicle 150 may repeat the registration processes for a few iterations. Then, the vehicle 150 may determine whether the failure is caused by sensor failures, by corrupted registration processes, or by corrupted occupancy map data (e.g., an update is not correctly installed).

The vehicle 150 detects 1110 objects in the 3D representation created from the stereo images. For example, the vehicle 150 may apply one or more machine learning models to localize and identify all objects in the 3D representation. The vehicle 150 may provide the 3D representation to the online HD map system 110 or to another third party service for object detection.

The vehicle 150 classifies 1112 the detected objects. An object may represent a fixed structure such as a tree or a building or may represent a moving object such as a vehicle. For example, the vehicle 150 may apply one or more machine learning models to classify all detected objects as moving objects or still objects. The vehicle 150 may alternatively provide the 3D representation to the online HD map system 110 or to another third party service for object classification.

The vehicle 150 removes 1114 moving objects from the 3D representation to create an updated occupancy map. In particular, the vehicle 150 removes moving objects from the 3D representation and uses the remaining portion of the 3D representation to update the existing occupancy map. For example, the vehicle 150 compares the remaining portion of the 3D representation to the existing occupancy map to determine whether to add new representations and/or whether to remove existing representations. For example, if the remaining portion of the 3D representation includes an object (or a road) that is not represented in the existing occupancy map, the vehicle 150 updates the existing occupancy map to include a representation of this object (or this road). As another example, if the existing occupancy map includes a representation of an object (or a road) that is not represented in the remaining portion of the 3D representation, the vehicle 150 updates the existing occupancy map to remove the representation of this object (or this road). As a further example, if the existing occupancy map includes a representation of an object (or a road) that is different from that in the remaining portion of the 3D representation, the vehicle 150 updates the representation of this object (or this road) in the existing occupancy map according to the remaining portion of the 3D representation.

The vehicle 150 compares 1116 the updated occupancy map to the existing occupancy map (i.e., the occupancy map stored in the local HD map store 275) to identify one or more discrepancies. The updated occupancy map includes 3D representations of objects in the environment surrounding the vehicle 150 detected from the sensor data. The occupancy map stored locally includes representations of objects in the environment previously detected. A discrepancy includes any object detected from the sensor data but not previously detected, any object previously detected but not detected from the sensor data, or differences between any object detected from the sensor data and also previously detected.

The vehicle 150 may verify a particular discrepancy. The verification can be performed in several ways. The vehicle 150 may continuously analyze newly-generated raw sensor data collected related to the object to verify whether the object as represented in the occupancy map 530 is accurate or should be updated. The sensors 105 continuously generates raw sensor data as the vehicle 150 traverses the road. The newly-generated raw sensor data can provide additional information to verify discrepancies because they are generated at different locations. The vehicle 150 may also notify a human reviewer (e.g., the passenger) for verification. The human reviewer can provide to vehicle 150 with instructions on whether the landmark object as represented in the local HD map store 275 should be updated or is accurate. The human reviewer can provide specific changes that should be made to the occupancy map 520. The vehicle 150 may also interact with a human reviewer to verify the discrepancy. For example, the vehicle 150 may notify the human reviewer to verify visible information that the vehicle 150 determines as likely to be inaccurate. Based on the human reviewer's input, the HD map system 110 completes verifying the discrepancy.

The vehicle 150 determines 1118 whether to report the identified discrepancies. The vehicle compares the identified discrepancies to a discrepancy threshold to determine whether any discrepancy is significant or if the identified discrepancies are collectively significant. For example, the vehicle 150 calculates a significance value for a particular discrepancy according to predetermined rules and compares the significance value to a threshold value to evaluate whether the discrepancy is significant. As one example, the vehicle 150 determines that an identified change is a significant change if it affects a lane usability or has a large effect on localization (i.e., registering 2D images or the LIDAR scanner data in the 3D coordinate system of the occupancy map.) The vehicle 150 may prioritize discrepancies to be reported based on significance values. A more significant discrepancy may be reported sooner than a less significant discrepancy.

The vehicle 150 transmits 1120 a discrepancy to the online HD map system 110 if it determines that the discrepancy is a significant discrepancy. The vehicle may send raw sensor data associated with the discrepancy to the online HD map system 110 along with the discrepancy. The vehicle 150 stores 1122 the updated occupancy map locally in the local HD map store 275. In some embodiments, the vehicle 150 transmits a discrepancy immediately if the associated significance value is greater than a threshold. The vehicle 150 may transmit sensor data (e.g., LIDAR scanner data, image data) along with the discrepancy. In some embodiments, only sensor data associated with the discrepancy is transmitted along with the discrepancy. For example, the vehicle 150 filters out LIDAR points and parts of the images that are substantially the same as before and sends the LIDAR point and/or image data for a very specific change. The vehicle 150 may send the sensor data associated with the 3D representation that are substantially the same as before at a later time (e.g., if the online HD map system 110 requests such information, or if bandwidth becomes available).

The online HD map system 110 updates the occupancy map stored in the HD map store 165 using the discrepancies received from the vehicle 150. In some embodiments, immediately if the associated significance value is greater than a threshold. The online HD map system 110 may request additional data (e.g., raw sensor data) associated with the discrepancy from the vehicle 150. The request may indicate a level of urgency that requires the vehicle 150 to respond within a predetermined time interval. If the level of urgency is low, the vehicle 150 may wait for a high speed connection to send the additional data to the online HD map system 110.

Figure 11B:
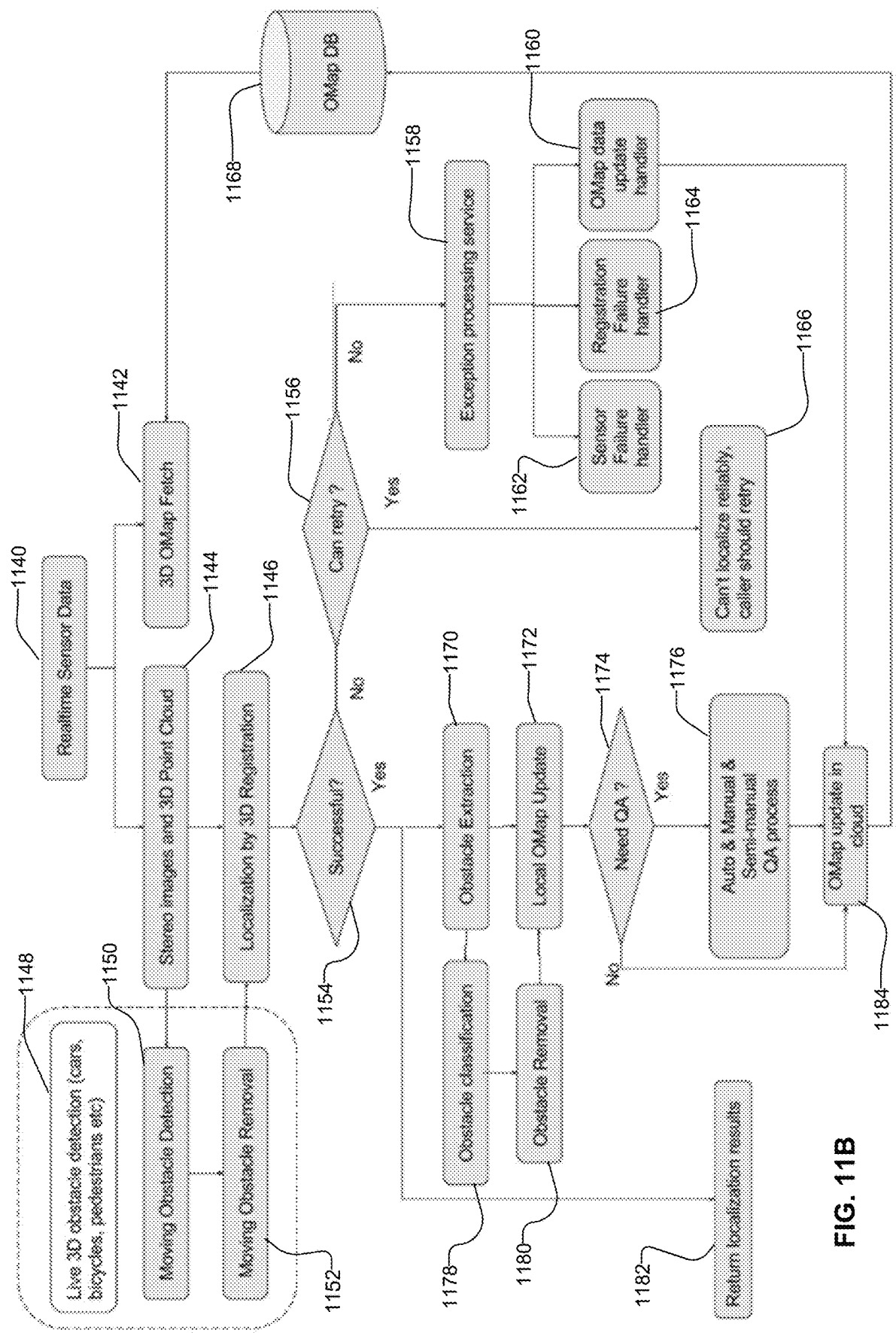
FIG. 11B is a flow chart illustrating an example process of a vehicle verifying and updating existing occupancy maps, according to one embodiment.

FIG. 11B is a flow chart illustrating an example process of a vehicle 150 verifying and updating existing occupancy maps, according to one embodiment. The vehicle 150 periodically receives 1140 real-time sensor data. The vehicle 150 determines a current location based on the sensor data. The vehicle 150 fetches 1142 occupancy map data based on the current location from the occupancy map database 1168. The vehicle 150 processes 1144 the sensor data to obtain images of surroundings of the vehicle 150 as well as LIDAR scanner points. The vehicle 150 registers 1146 the images in the 3D coordinate system of the occupancy map to thereby create a 3D representation of the surroundings. The vehicle 150 may perform 1148 live 3D obstacle detection concurrently with registering the images. The vehicle 150 detects 1150 any moving obstacles, and can remove 1152 certain moving obstacles from the 3D representation of the surroundings. The vehicle 150 may remove moving obstacles to boost localization success rate. Steps 1148, 1150, and 1152 may occur in real-time, while the remaining steps may occur offline.

The vehicle 150 determines 1154 whether the 3D registration is successful. If the 3D registration is successful, a successful localization result is returned 1182 to vehicle control system. The real-time sensor data will be further processed, either in the background or later. The vehicle 150 extracts 1170 obstacles from the 3D representation. The vehicle 150 classifies 1178 the obstacles as moving or still. The vehicle 150 removes 1180 moving obstacles from the 3D representation. The vehicle 150 updates 1172 the local occupancy map based on the 3D representation of which the moving obstacles are removed. The vehicle 150 determines 1174 whether the updated local occupancy map needs verification. If verification is determined as needed, the vehicle 150 can perform 1176 a combination of auto, manual, and/or semi-manual verification. If verification is determined as unnecessary, the vehicle 150 can provides occupancy map update data to the cloud, and the cloud updates 1184 the occupancy map in the cloud. If a major difference in the OMap stored in the cloud is detected, the on-vehicle system may decide to report to the cloud.

If localization fails and cannot retry, an exception processing service can be invoked. If the 3D registration fails, the vehicle 150 can retry 1156 the 3D registration. If the 3D registration continues to fail, the vehicle 150 can invoke 1158 the exception processing service. The vehicle 150 can also invoke 1162 a sensor failure handler upon failure of any of its sensors. The vehicle 150 can further invoke 1164 a registration failure handler for registration fails. After ruling out sensor and other failures, the vehicle 150 reports the event to cloud. The vehicle 150 can invoke 1160 an occupancy map update handler for handling updates to the cloud.

Map Data Collection

A vehicle computing system interacts with the online HD map system to ensure that enough data is collected to update maps while minimizing communication cost between a fleet and the cloud. The follow factors are considered as part of the load balancing algorithm. 1) The amount of data needed to cross-check the quality of map updates detected. When a change is detected, it often needs to be validated by other vehicles before it's disseminated to other vehicles. 2) The amount of data a given vehicle has sent to the cloud in the past. The upload history of a car is considered such that a vehicle will not surpass its data consumption cap.

Figure 12:
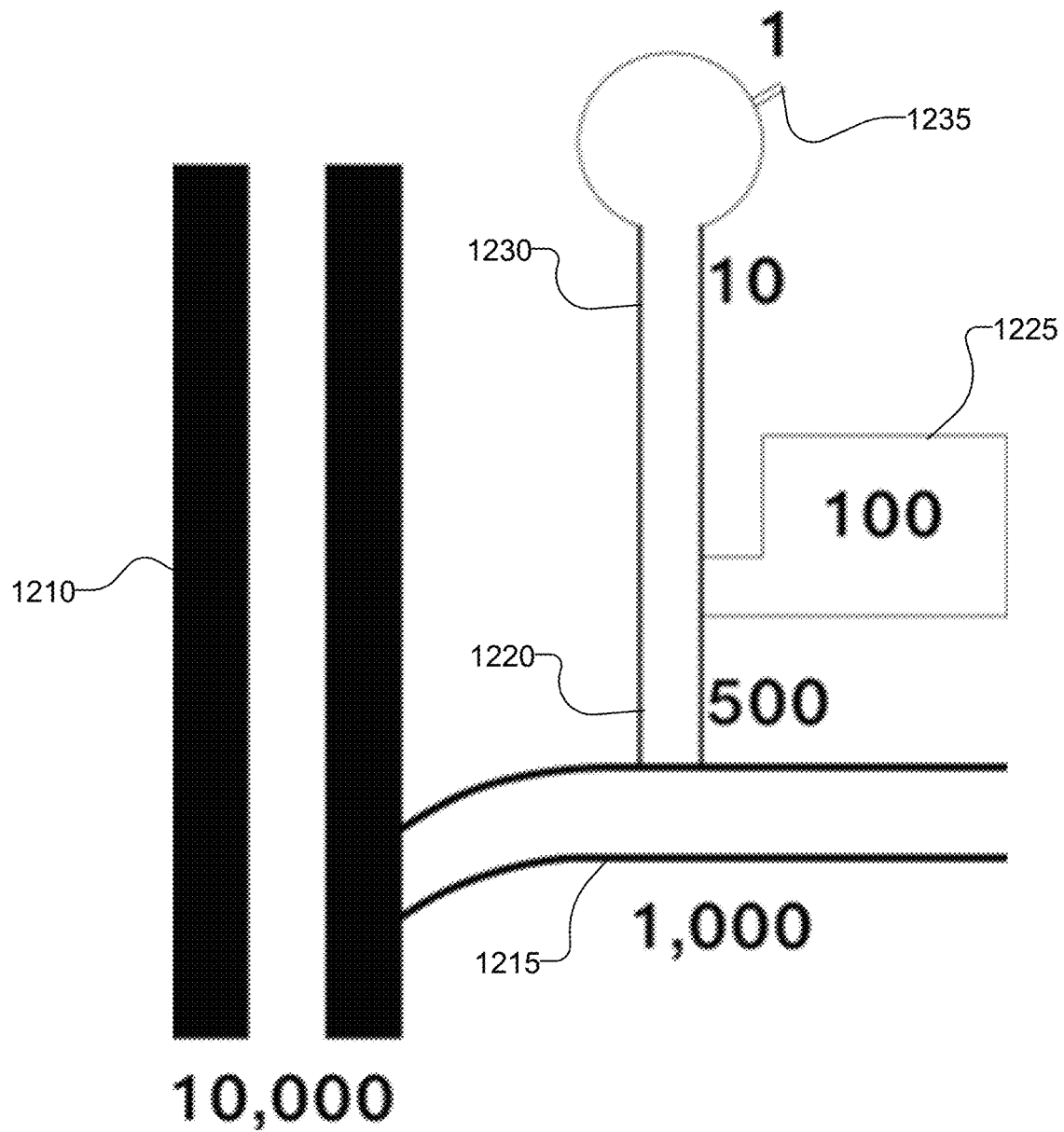
FIG. 12 illustrates the rate of traffic in different types of streets, according to an embodiment.

FIG. 12 illustrates the rate of traffic in different types of streets, according to an embodiment. A street refers to roads, highways, avenues, boulevard, or other paths that vehicles can travel on. The different types of streets are interconnected in a street network, which comprises different levels of streets. As seen in FIG. 12, different levels of streets include residential driveways 1235, residential streets 1230, parking lots 1225, tertiary streets 1220, secondary streets 1215, and highways 1210. The street network may comprise zero or more of each of these levels of streets. In other embodiments additional levels of streets may exist, such as country backroads, private roads, and so on, which behave similarly to those described herein.

Each level of street has an associated magnitude of traffic as seen in the figure. For example, residential driveways 1235 may typically have a small number of vehicles traversing them on the order of one vehicle per day. Residential streets 1230 may typically have a relatively higher number of vehicles traversing them on the order of ten vehicles per day. Parking lots 1225 may typically have a number of vehicles traversing them on the order of 100 vehicles per day. Tertiary streets 1220 may typically have a number of vehicles traversing them on the order of 500 vehicles per day. Secondary streets 1215 may typically have a number of vehicles traversing them on the order of 1000 vehicles per day. Highways 1210 may typically have a number of vehicles traversing them on the order of 10,000 vehicles per day. The online HD map system uses the measure of traffic on each street to select vehicles from which to access map related data.

Accordingly, the level of traffic on a street for a given street is significant for vehicle data load balancing and is considered by a map data request module 1330, as described below, when selecting a vehicle 150. For example, a highway 1210 will have much more traffic per day than a residential street 1230. As such, a map discrepancy on a highway will be reported by many more vehicles than a map discrepancy on a residential street. Furthermore, different vehicles reporting different map discrepancies may refer to the same discrepancy. For example, a first vehicle may report a crashed vehicle in a lane of a street, and a second vehicle may report placement of cones at the same location, presumably around the crashed vehicle. Hence the amount of traffic on the street associated with a map discrepancy is used to select vehicles for requesting data by the online HD map system 110. Also, due to the fewer number of vehicles traversing certain levels of streets, the online HD map system 110 is less discriminating when selecting vehicles for those streets, since fewer vehicles total shall be traversing them and therefore the pool of valid vehicles for selection will be smaller. Therefore, if a street has very low traffic, the online system may select the same vehicle multiple times to request the vehicle to upload the data.

Figure 13:
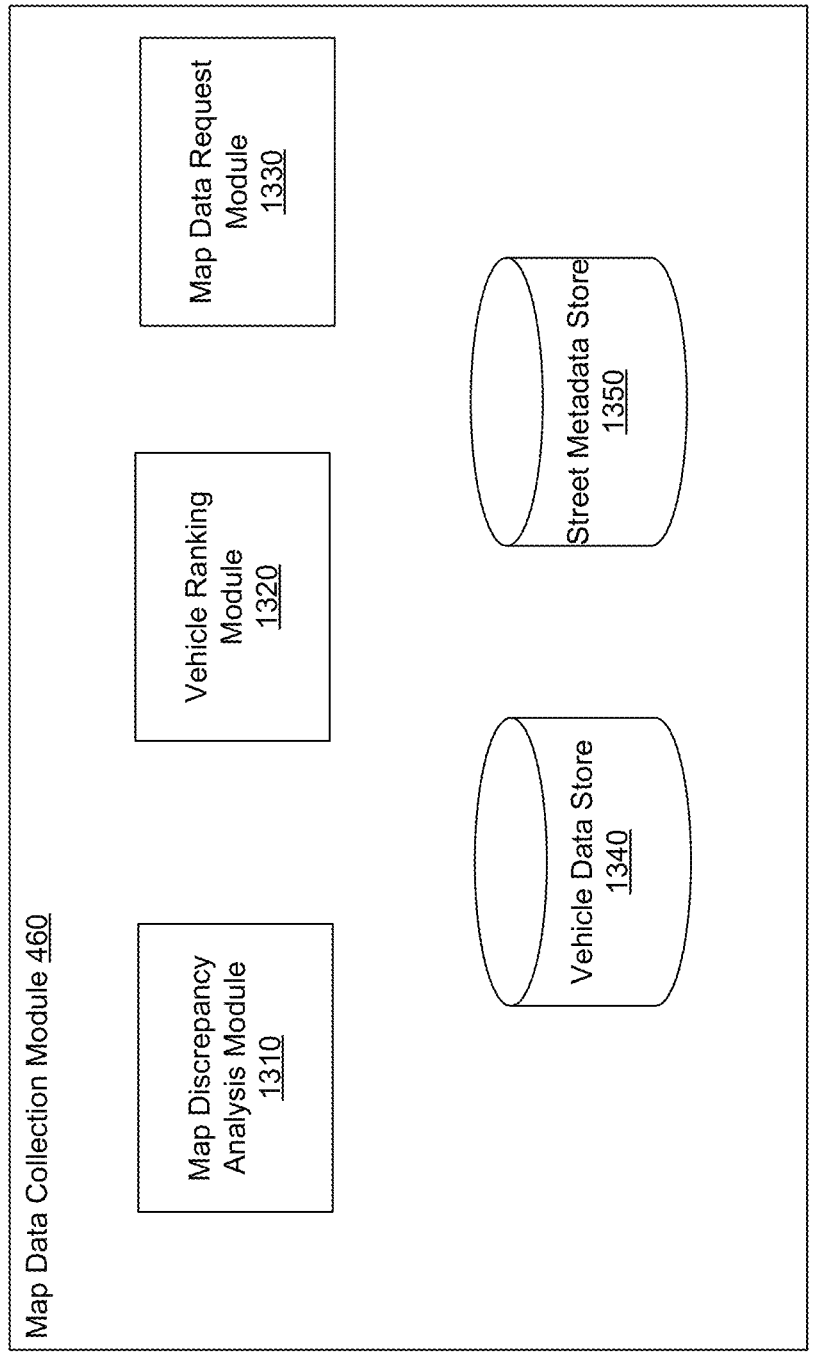
FIG. 13 shows the system architecture of a map data collection module, according to an embodiment.

FIG. 13 shows the system architecture of a map data collection module 460, according to an embodiment. The map data collection module 460 comprises a map discrepancy analysis module 1310, a vehicle ranking module 1320, the map data request module 1330, and a vehicle data store 1340. Other embodiments of map data collection module 460 may include more or fewer modules. Functionality indicated herein as performed by a particular module may be performed by other modules instead.

In an embodiment, each vehicle sends status update messages, or update messages, to the online HD Map system 110 periodically. The status update message includes metadata describing any map discrepancies identified by the vehicle indicating differences between the map data that the online HD map system provided to the vehicle and the sensor data that is received by the vehicle from its sensors. In an embodiment, even if the vehicle determines that there are no map discrepancies at a location, the vehicle provides a status update message indicating that no map discrepancies were noticed. These status messages allow a map data collection 460 to verify if a map discrepancy was erroneously reported by a vehicle. In addition, these status messages can allow older data from a particular area to be aged out and replaced with newer about that area so that the HD map includes the most recent data that is possible.

The map discrepancy analysis module 1310 analyzes data received from vehicles as part of the status update messages to determine whether the vehicle reported a map discrepancy. If the map discrepancy analysis module 1310 determines that a status update message received from a vehicle describes a discrepancy, the map discrepancy analysis module 1310 further analyzes the reported map discrepancy, for example, to determine a level of urgency associated with the discrepancy as described supra with regard to map discrepancy module 290.

The map data collection module 460 stores information describing the data received from vehicles in the vehicle data store 1340. This includes the raw data that is received from each vehicle as well as statistical information describing the data received from various vehicles, for example, the rate at which each vehicle reports data, the rate at which a vehicle was requested to upload additional map data for a particular location, and so on.

The vehicle ranking module 1320 ranks vehicles based on various criteria to determine whether the map data collection module 460 should send a request to a vehicle to provide additional map data for a specific location. In an embodiment, the vehicle ranking module 1320 ranks vehicles based on the upload rate of individual vehicles. In other embodiments, the vehicle ranking module 1320 may rank vehicles based on other criteria, for example, a measure of communication bandwidth of the vehicle, whether the vehicle is currently driving or stationary, and so on.

The street metadata store 1350 stores a measure of the amount of traffic on each street at various locations as illustrated in FIG. 12. For example, the street metadata store 1350 may store a table mapping various portions of streets and a rate at which vehicles drive on that portion of the street. The a rate at which vehicles drive on that portion of the street may be specified as an average number of vehicles that drive on that street in a given time, for example, every hour. In an embodiment, the street metadata store 1350 also stores the rate at which vehicles travel on a portion of the street at particular times, for example, night time, morning, evening, and so on.

The map data request module 1330 selects a vehicle for requesting additional map data for specific location and send a request to the vehicle. The map data request module 1330 sends a request via the vehicle interface module 160 and also receives additional map data via the vehicle interface module 160. The map data request module 1330 selects a vehicle based on various criteria including the vehicle ranking determined by the vehicle ranking module 1320 and a level or urgency associated with the map discrepancy, and a rate at which vehicles drive through that location of the street. In an embodiment, the map data request modules 1330 preferentially selects vehicles 150 which have data for the specific location recorded during daylight hours over vehicles with data recorded at dawn, dusk, or night. Upon receipt of a response to a request, the map data request module 1330 may inform other modules of the online HD map system 110 to implement changes to the HD map using the additional data of the response to the request.

Outdated map alerts comprise notifications to the map data collection module 460, such as from the map update module 420, which indicate that a portion of an HD map is outdated and requires updating with new information. It is desirable for HD map data to be up to date. This requires at least periodic updating of the HD map data. Not all HD map data is of the same age, with some data having been collected earlier than other data. The online HD map system 110 may track how old HD map data is. For each lane element the online HD map system 110 may record the newest and oldest times data was used to build that lane element, for example a timestamp of when the oldest used data was collected and a similar timestamp for the newest used data. An outdated map alert may be sent requesting new map data for a lane element if either the oldest timestamp or newest timestamp of that lane element's data is older than a respective threshold age. For example, if the oldest data is more than four weeks old, or if the newest data is over a week old, an outdated map alert may be sent requesting additional data to update the HD map. As described herein, any response to a map discrepancy could similarly be applied to addressing an outdated map alert.

The map data request module 1330 may have a backlog of multiple map discrepancies or outdated map alerts which require additional data from vehicles 150 to be requested by the map data collection module 460. In such cases, the map discrepancies and/or outdated map alerts, henceforth together generally referred to as update requests, are managed by the online HD map system 110 which also prioritizes their handling.

More urgent update requests may be prioritized over less urgent update requests, for example, based on the degree of urgency of each update request. For example, an update request may be labeled critical, meaning it is of utmost importance, which may cause the online HD map system 110 to move it to the front of a queue of requests. Examples of critical update requests may include new routes and routes where a significant map discrepancy is detected by multiple cars. For example, if one hundred vehicles detect closure of a highway, the online HD map system 110 may prioritize that map discrepancy. The online HD map system 110 may collate map discrepancies pertaining to the same map discrepancy into one for which to send requests for additional data, for example, the above-mentioned map discrepancies from the one hundred vehicles. Map discrepancies may be collated, or combined into one map discrepancy, by analyzing the map discrepancy fingerprint of each map discrepancy for similarity, wherein map discrepancies within a threshold similarity of one another are handled by the online HD map system 110 as a single map discrepancy.

Non-critical update requests may have various levels of non-criticality, for example, update requests where the oldest timestamp of used data is older than a threshold age may be prioritized over update requests where the newest timestamp is older than a threshold age.

Older update requests may be prioritized over newer update requests. For example, an update request a week old may be prioritized over an update request an hour old. Map discrepancies may be prioritized over outdated map alerts, or vice versa. If an update request is non-urgent, the online HD map system 110 may delay accessing data for it from vehicles if there are other urgent requests that need to be addressed, Furthermore, the online HD map system may wait to find a vehicle with low update load so as to minimize per vehicle data upload requirements.

To properly update an HD map in response to an update request, additional data from more than one vehicle may be required. In such cases the map data request module 1330 requests additional data from a plurality of vehicles 150. If a certain number of vehicles are required to gather additional information for a particular update request and there are not enough applicable vehicles to fully handle the update request, then every applicable vehicle is sent a request for additional information. Otherwise, a subset of available vehicles is selected. The plurality of vehicles selected to respond to a request for additional data are selected similar to selection of a single vehicle, i.e., based on the upload rate of each vehicle to minimize upload rate per vehicle by distributing requests for additional data across the plurality of vehicles with vehicles of lowest upload rate taking precedence. The upload rate is a rate of data uploaded per time period (e.g., bytes of data uploaded per time period, such as over 10 seconds, 1 minute, 10 minutes, an hour, etc.)

Processes associated with updating HD maps are described herein. The steps described herein for each process can be performed in an order different from those described herein. Furthermore, the steps may be performed by different modules than those described herein.

Figure 14:
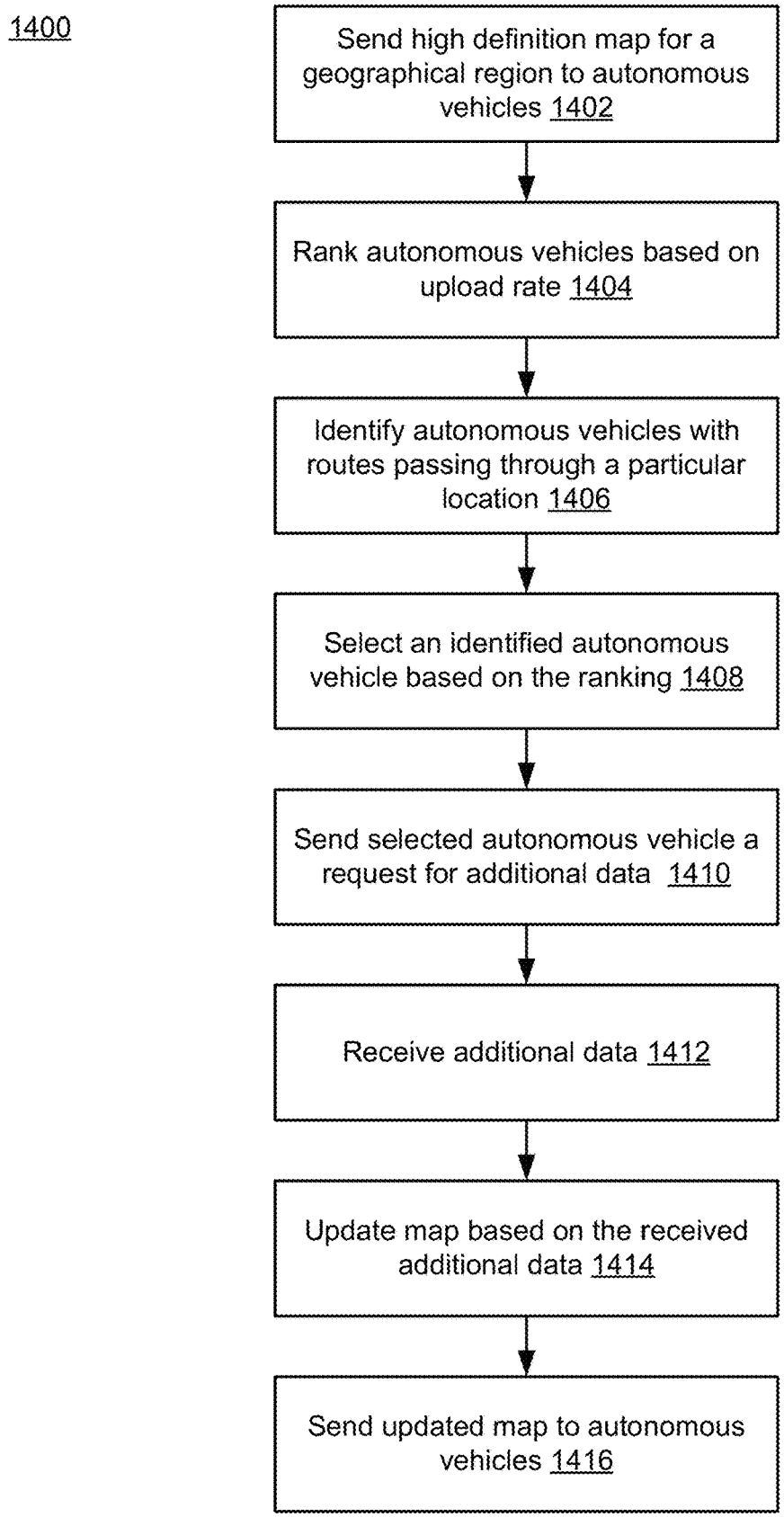
FIG. 14 illustrates the process of updating HD maps with vehicle data load balancing, according to an embodiment.

FIG. 14 illustrates the process 1400 of updating HD maps with vehicle data load balancing, according to an embodiment. The online HD map system 110 sends 1402 HD maps for a geographical region to a plurality of vehicles 150 which will drive or are driving routes which traverse that geographical region. The online HD map system 110 determines for each of the plurality of vehicles 150 an upload rate based on a frequency at which the vehicle uploads data to the online system. The online HD map system 110 then ranks 1404 the plurality of vehicles 150 based on the upload rate or recently uploaded data size of each vehicle 150 to balance the burden of uploading data collected via the sensors across the fleet of vehicles. For example, for each vehicle 150 there is a recorded data load indicating how much data the vehicle has uploaded to the online HD map system 110 that day, measured, for example, in megabytes (MB). In an embodiment, lower upload rates are ranked higher and higher upload rates are ranked lower. For example, a vehicle 150 with an upload total of 100 MB of data over the last accounting period or time period (e.g., days or a week)y would be ranked higher than a vehicle with an upload total of 500 MB over the accounting period. Upload rate is a rate of data uploaded (e.g., in bytes) over a period of time (e.g., over a few minutes, over one or more days, over one or more weeks, over one or more months, etc.). The time period can be adjustable to optimize performance. Thus, is tracking data uploads per week allows for better load balancing across the fleet of vehicles then tracking per day, weekly tracking can be used. And this can be adjusted over time to continue to optimize performance, including being adjusted year to year, or even throughout the year (e.g., winter versus summer, over holiday periods, etc.).

The online HD map system 110 then identifies 1406 vehicles 150 of the plurality of vehicles with routes passing through a particular location of the geographical region, for example, a particular intersection of a certain road. The particular location can be a location about which the online system needs or desires to have collected current vehicle sensor data. The particular location may be chosen for any of a plurality of reasons, for example, because the HD map data for the particular location has surpassed a threshold age, or because a map discrepancy was detected at the particular location which requires further investigation.

The online HD map system 110 then selects 1408 an identified vehicle 150 based on the ranking. For example, if the vehicle with the lowest upload rate, ranked first, does not pass through the particular location, but the vehicle with the second lowest upload rate, ranked second, does, then the vehicle with the second lowest upload rate is selected. In other embodiments other factors may be considered when selecting 1408 an identified vehicle, for example, a time of day at which the identified vehicle traverses the particular location, or time of day (e.g., sunlight direction) versus direction of travel, as this may affect quality of the camera data. The vehicles chosen can be the ones most likely to collect the highest quality camera data. So vehicles traveling at night may have a lower priority over those traveling during the day, as night time camera data may not be as clear as day time camera data. Similarly, vehicles with the sun behind them may have a lower priority over those driving into the sun, since camera data coming from a vehicle driving directly into the sun may be lower quality.

The online HD map system 110 then sends 1410 the selected vehicle 150 a request for additional data. In particular, the request for additional data may pertain to the particular location of the geographical region. The additional data requested may be in general, i.e. whatever data the selected vehicle is able to sense while traversing the particular location, or may be specific, i.e. a particular kind of sensor data. The request may comprise a start location and an end location at which to begin recording data and at which to cease recording data, respectively, for responding to the request for additional data.

The online HD map system 110 then receives 1412 the additional data from the vehicle 150, such as over a wireless network. The additional data may be formatted such that the online HD may system 110 can incorporate the additional data into an update to the HD maps. The online HD map system 110 then uses the additional data to update 1414 the HD maps. For example, if the additional data pertains a lane of a road which has temporarily closed due to construction work nearby, the online HD map system 110 may update the map to indicate that lane of that road as temporarily closed. Alternatively, the additional data may pertain to data already in the online HD map system 110 which as passed a threshold age and therefore requires updating to ensure the HD map is up to date. The online HD map system 110 then sends 1416 the updated HD map to the plurality of vehicles so that they may use a more accurate HD map while driving.

Figure 15:
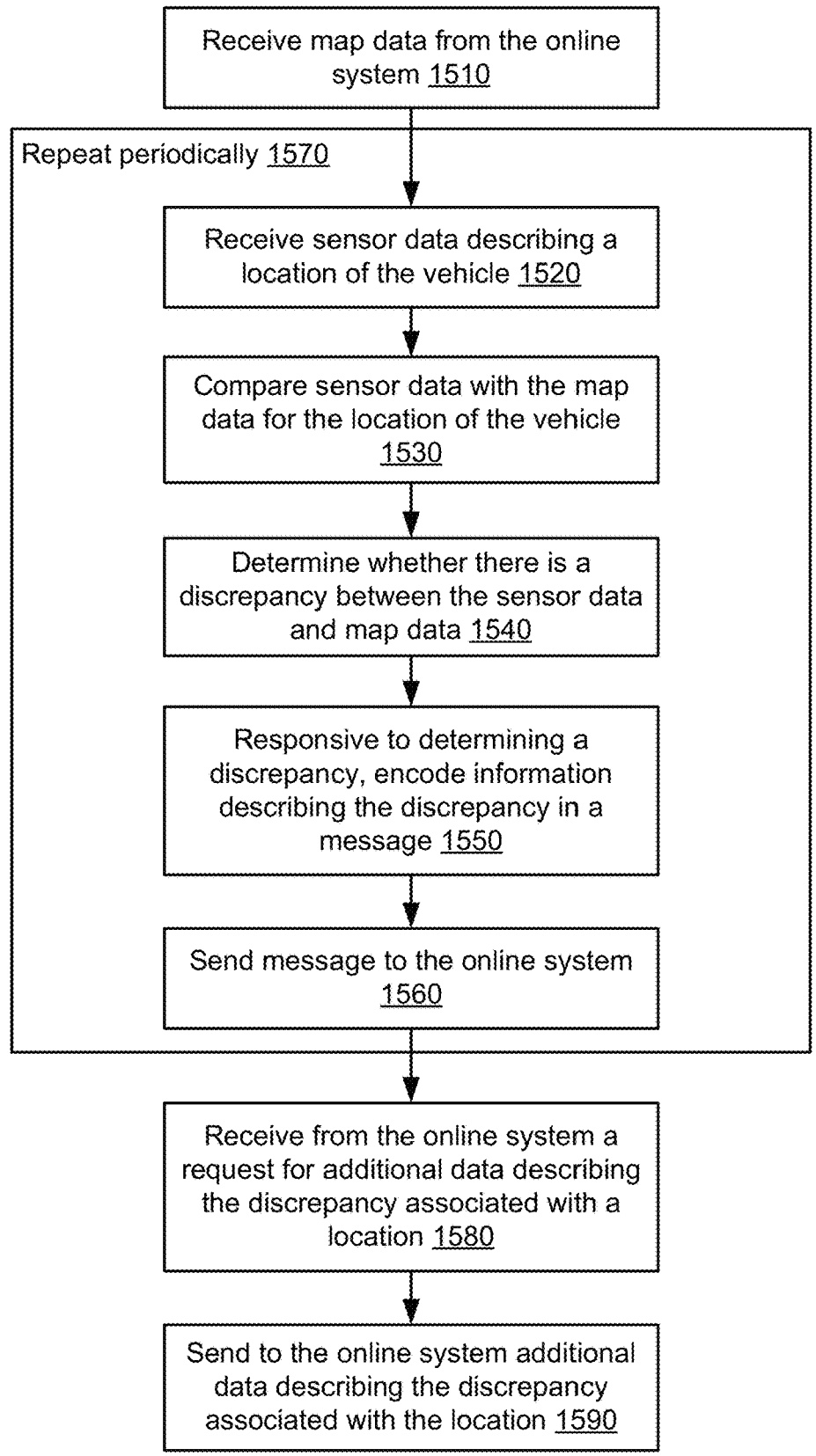
FIG. 15 illustrates the process of updating HD maps responsive to detecting a map discrepancy, with vehicle data load balancing, according to an embodiment.

FIG. 15 illustrates the process 1500 of updating HD maps responsive to detecting a map discrepancy, with vehicle data load balancing, according to an embodiment. The vehicle 150 receives 1510 map data from the online HD map system 110 comprising HD maps for a geographical region. The vehicle 150 then receives 1520 sensor data 230 describing a particular location through which the vehicle 150 is driving.

The vehicle 150 compares 1530 the sensor data 230 with the map data for the particular location the sensor data 230 pertains to. Using the comparison, the vehicle 150 determines 1540 whether there is a discrepancy between the sensor data and map data. For example, the map data may indicate that a road has three lanes the vehicle 150 may use, but sensor data 230 may indicate that one of the lanes is obstructed and therefore closed, such as due to nearby construction or roadwork.

Upon determining that there is a map discrepancy, the vehicle 150 encodes 1550 information describing the discrepancy in a message. The message, or update message, is described with greater detail in the earlier section with regard to the map discrepancy module 290. The message comprises information which the online HD map system 110 may use to understand and/or analyze the discrepancy and/or update HD maps with the new information. Upon encoding 1550 the message, the message is sent 1560 to the online HD map system 110, for example, over a wireless network. Sending a message increases the upload rate of the vehicle which sent the message, proportional to the size of the message sent.

Receiving 1520 sensor data describing a location of the vehicle 150, comparing 1530 sensor data with map data for the location of the vehicle, determining 1540 whether there is a map discrepancy between the sensor data and map data, encoding 1550 information describing the discrepancy in a message, and sending 1560 the message to the online HD map system 110 may repeat 1570 periodically. For example, they may repeat every threshold amount of time or threshold distance driven, for example every hour and/or every 10 miles. In an embodiment, the vehicle 150 records all discrepancies for a given window of time or distance between periodic messages and encodes all those recorded discrepancies into the next periodic message. In an embodiment, messages are only sent when the vehicle is docked at a high bandwidth access point to a network, though in general these messages can be designed to be small and can be sent on cellular networks, so a high bandwidth access point is not needed in other embodiments.

The vehicle 150 may then receive 1580 a request from the online HD map system 110 requesting additional data describing the map discrepancy at the particular location. The request may specify one or more desired types of sensor data or may ask for any and all sensor data capable of being measured by the vehicle at the particular location. Furthermore the request may specify a limit to the amount of data to be reported, for example, for the vehicle 150 to respond with no more than 500 MB of data pertaining to the map discrepancy. The vehicle 150 then sends 1590 the online HD map system 110 the additional data describing the map discrepancy associated with the particular location. In an embodiment, sending the additional data involves traversing the particular location and recording additional sensor data for the particular location, such as data types requested by the online HD map system 110.

In an embodiment, the vehicles follow a hand-shake protocol with the online HD map system. A vehicle sends a message after travelling a fixed amount of distance, say X miles, whether or not the vehicle detects a map discrepancy. The message includes various types of information including an identifier for the vehicle, a timestamp indicating the time the message was sent, information describing the coarse route traveled (for example, using latitude/longitude coordinates sampled at a fixed interval (e.g., 200 m), if lane elements were traversed (i.e., driven over existing region in the map) the message includes a list of traversed lane element IDs, information describing a scope of change if any (what type of change and how big), a change fingerprint (to help identify duplicate changes), and a size of the change packet.

Alternative Embodiments

In an embodiment, the online HD map system performs the following steps for distributing load of uploading data among vehicles. The online HD map system identifies: (1) critical routes (routes where multiple copies are needed) (2.) non-critical routes prioritized and (3.) vehicle sorted by their recent uploads.

The online HD map system handles critical routes first as follows. The online HD map system first identifies cars that have data for a critical route, and sorts them. For each car, online HD map system sums up the number of critical routes that it covered. The online HD map system takes all cars that covered at least one critical route and sorts them by their number of critical routes, least number of routes first. If the online HD map system determines that for each critical route, if only N or fewer cars covered a new route, the online HD map system requests all the sensor data from those cars. If the online HD map system determines that more than N cars covered a route, the online HD map system picks the first N cars (from the sorted list of cars) that have that route. For the N selected cars, the online HD map system keeps track of the route request and moves them to the bottom of the sorted list.

The online HD map system handles non-critical routes as follows. The online HD map system builds a sorted list of candidate cars. The online HD map system determines the list of cars that had no critical routes and cars from the critical route group that didn't get selected for upload. The online HD map system sorts the lists by their upload load for the last period (e.g., week) in least upload first order. For each non-critical route, the online HD map system selects the vehicle from the top of the list. The online HD map system keeps track of the route request and moves them to the bottom of the sorted list.

The online HD map system as a result obtains a table of vehicles and route requests. When the vehicle arrives at a high bandwidth communication location, the vehicle issues a "docked" protocol message to the online HD map system. The online HD map system responds with: a list of route data to upload. The vehicle proceeds to upload the requested data. Alternatively the online HD map system responds that no uploads are requested. The vehicle marks its route data as deleteable.

Accordingly, the online HD map system ensures that the online HD map system gets the data for newly driven routes, the online HD map system gets the data for changed routes, that bandwidth is conserved by not requesting data from every car that goes down the same road, and that each car is not spending a great amount of time/energy and bandwidth uploading data since the online HD map system distributes the load fairly among all cars.

Randomized Data Uploads

In another embodiment, the online HD map system tracks the route handshakes as described above, and maintains a database of route coverage frequency. If a given route is covered N times a day by vehicles, and the online HD map system ensures that the latest and oldest data for that route is within a given period of time (our freshness constraint). The online HD map system estimates how often the online HD map system needs an update to keep this freshness constraint (statistically).

For example, assume the online HD map system determines that a route gets N coverages a day, where N=10. The online HD map system determines that the latest data to be 2 days old and oldest data to be 14 days old. The online HD map system determines that satisfying the latest time constraint requires select 1 out of 20 samples, while satisfying the oldest time constraint requires only 1 out of 140 samples. The online HD map system takes the maximum of these 2 (1 out of 20) and use that as a random probability for a coverage of that route to be requested.

When the online HD map system receives a message from a vehicle with data for a particular route, the online HD map system retrieves the probability for a coverage of that route as a percentage value. The online HD map system computes a random number between 0.0 and 100.0 and if the number is below the retrieved probability, then the online HD map system requests the data to be uploaded.

According to other embodiments, the online HD map system performs additional checks. For example, if the online HD map system determines that if the freshness constraint for a route is not valid, the online HD map system simply requests the route data. For new data or changes, the online HD map system simply requests the upload from the first N coverages.

Computing Machine Architecture

Figure 16:
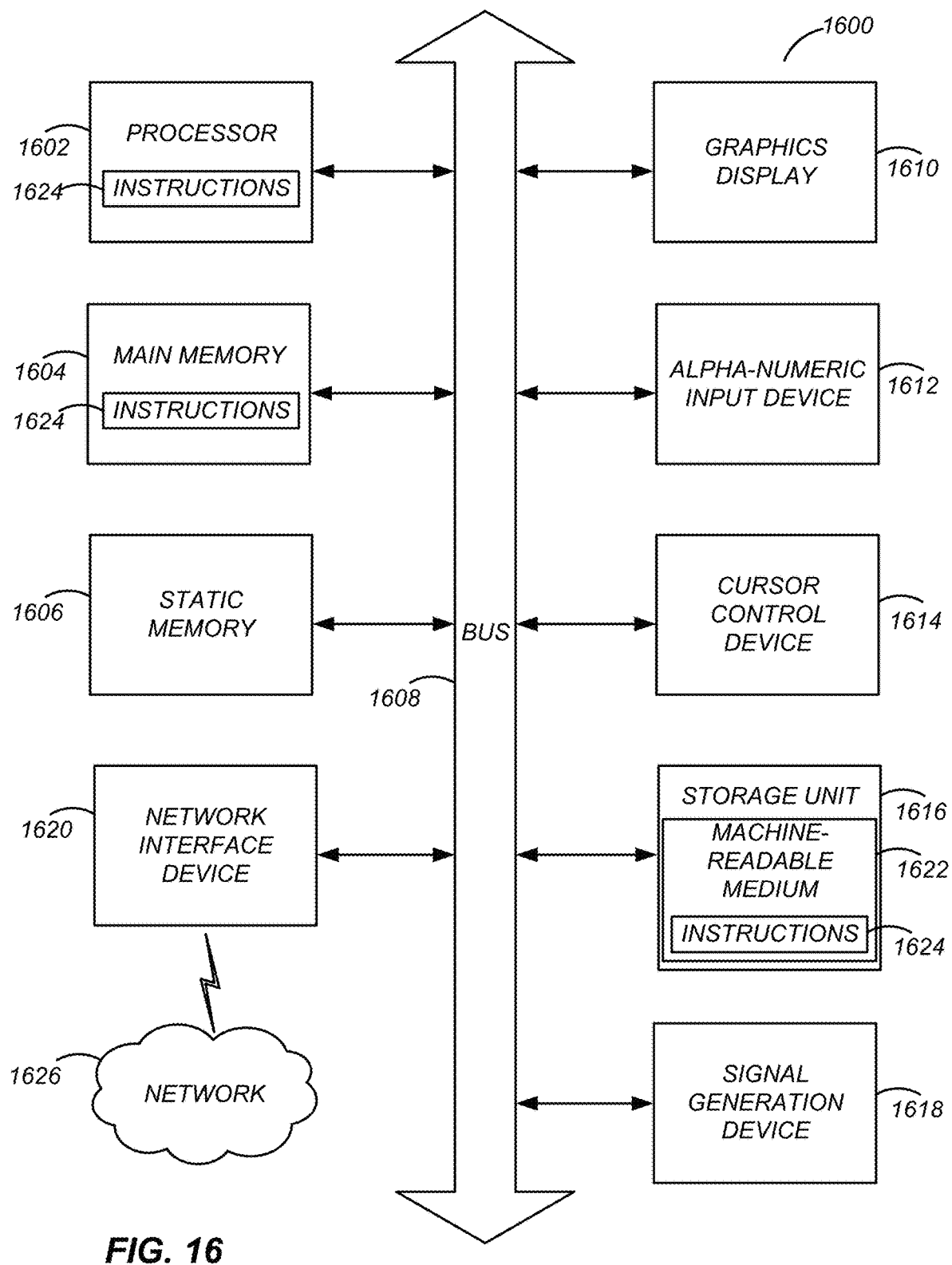
FIG. 16 illustrates an embodiment of a computing machine that can read instructions from a machine-readable medium and execute the instructions in a processor or controller.

FIG. 16 is a block diagram illustrating components of an example machine able to read instructions from a machine-readable medium and execute them in a processor (or controller). Specifically, FIG. 16 shows a diagrammatic representation of a machine in the example form of a computer system 1600 within which instructions 1624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1624 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes a processor 1602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1604, and a static memory 1606, which are configured to communicate with each other via a bus 1608. The computer system 1600 may further include graphics display unit 1610 (e.g., a plasma display panel (PDP), a liquid crystal display (LCD), a projector, or a cathode ray tube (CRT)). The computer system 1600 may also include alphanumeric input device 1612 (e.g., a keyboard), a cursor control device 1614 (e.g., a mouse, a trackball, a joystick, a motion sensor, or other pointing instrument), a storage unit 1616, a signal generation device 1618 (e.g., a speaker), and a network interface device 1620, which also are configured to communicate via the bus 1608.

The storage unit 1616 includes a machine-readable medium 1622 on which is stored instructions 1624 (e.g., software) embodying any one or more of the methodologies or functions described herein. The instructions 1624 (e.g., software) may also reside, completely or at least partially, within the main memory 1604 or within the processor 1602 (e.g., within a processor's cache memory) during execution thereof by the computer system 1600, the main memory 1604 and the processor 1602 also constituting machine-readable media. The instructions 1624 (e.g., software) may be transmitted or received over a network 1626 via the network interface device 1620.

While machine-readable medium 1622 is shown in an example embodiment to be a single medium, the term "machine-readable medium" should be taken to include a single medium or multiple media (e.g., a centralized or distributed database, or associated caches and servers) able to store instructions (e.g., instructions 1624). The term "machine-readable medium" shall also be taken to include any medium that is capable of storing instructions (e.g., instructions 1624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

We claim:

1. A method of maintaining a high definition map, comprising:
   receiving, from an online system by a vehicle, a high definition map for a geographical region, the high definition map comprising geometric and semantic description of the geographical region;
   receiving, from sensors of the vehicles, sensor data comprising information of a current location in the geographical region;
   determining the current location of the vehicle based on the sensor data;
   identifying a first set of objects in the geometric and semantic description of the geographical region, each object of the first set associated with a confidence value indicating a probability of the geometric and semantic description of the object being accurate;
   identifying a second set of objects based on the sensor data;

comparing the first set of objects to the second set of objects;
responsive to determining a first object of the first set matches a second object of the second set, sending a request to update the high definition map to increase a confidence value associated with the first object.

2. The method of claim 1, wherein comparing the first set of objects to the second set of objects comprises comparing geometric shape data and location data associated with the first set of objects to geometric shape data and location data associated with the second set of objects.

3. The method of claim 1, further comprising:
responsive to determining the first object matches the second object, verifying an operation of the first object.

4. The method of claim 3, wherein verifying the operation of the first object comprises:
determining information displayed by the first object;
determining information transmitted from the first object; and
responsive to determining the information displayed differs from the information transmitted, determining the verification fails.

5. The method of claim 4, further comprising:
responsive to determining the failure, determining whether the failure was caused by errors.

6. The method of claim 1, further comprising:
responsive to determining the first object matches the second object, classifying the first object;
responsive to determining the first object being classified into a predetermined object type, verifying an operation of the first object.

7. The method of claim 1, further comprising:
responsive to determining a second object of the first set does not match any object of the second set, sending a request to update the high definition map to decrease a confidence value associated with the second object.

8. The method of claim 1, further comprising:
responsive to determining a third object of the second set does not match any object of the first set, sending a request to update the high definition map to include a representation of the third object.

9. The method of claim 8, further comprising sending sensor data associated with the third object with the request.

10. The method of claim 1, wherein the request includes at least one of a time stamp, an object ID associated with the first object, and information associated with the vehicle.

11. The method of claim 1, wherein the sensor data comprises images captured by camera, LIDAR scanner data, GPS data, and EVIU data.

12. A method of updating a high definition map, comprising:
receiving, from vehicles, verification records including verification information of a high definition map that includes geometric and semantic description of objects in the geographical region, each object associated with a confidence value indicating a probability of the geometric and semantic description of the object being accurate;
organizing the verification records based on the locations into groups, each group of verification records corresponds to a sub region of the geographical region;
for each group of verification records:
determining a record type of each verification record; and
updating the confidence values associated with the record types.

13. The method of claim 12, wherein the updating the confidence values comprises:
responsive to a verification record being a first type, increasing the confidence value associated with one of the objects corresponding to the verification record.

14. The method of claim 13, further comprising determining an amount of adjustment based at least on the confidence value associated with the object.

15. The method of claim 12, wherein the updating the confidence values comprises:
responsive to a verification record being a first type, decreasing the confidence value associated with one of the objects corresponding to the verification record.

16. The method of claim 15, further comprising determining an amount of adjustment based at least on the confidence value associated with the object.

17. The method of claim 12, wherein the updating the confidence values comprises:
responsive to a verification record being a first type:
identifying a new object based on sensor data associated with the verification record;
determining a confidence value associated with the new object based on the sensor data;
determining geometric and semantic description of the new object; and
updating the high definition map to include the geometric and semantic description of the new object associated with the confidence value.

18. The method of claim 12, further comprising:
for each group of verification records: identifying an outlier verification record and removing the outlier verification record from the group, the verification result of the outlier verification record being inconsistent within the group.

19. The method of claim 12, further comprising:
for each group of verification records: identifying an outlier verification record and removing the outlier verification record from the group, the verification result of the outlier verification record being inconsistent within the group.

20. The method of claim 12, further comprising sending a request for verification records to the vehicles, wherein the verification records are received in response to the request.

* * * * *